(12) United States Patent
Ohwada

(10) Patent No.: US 7,003,701 B2
(45) Date of Patent: Feb. 21, 2006

(54) SYSTEM FOR FACILITATED ANALYSIS OF PCI BUS MALFUNCTION

(75) Inventor: Masao Ohwada, Tokyo (JP)

(73) Assignee: NEC Corporation, Tokyo (JP)

( * ) Notice: Subject to any disclaimer, the term of this patent is extended or adjusted under 35 U.S.C. 154(b) by 528 days.

(21) Appl. No.: 10/051,062

(22) Filed: Jan. 22, 2002

(65) Prior Publication Data

US 2002/0124207 A1 Sep. 5, 2002

(30) Foreign Application Priority Data

Jan. 23, 2001 (JP) ............................. 2001-013923

(51) Int. Cl.
*G06F 11/00* (2006.01)

(52) U.S. Cl. ........................... 714/43; 714/56; 714/57; 710/109; 710/117

(58) Field of Classification Search ................. 714/43, 714/23, 56, 44, 57; 710/109, 244, 113, 117, 710/124
See application file for complete search history.

(56) References Cited

U.S. PATENT DOCUMENTS

| | | | | |
|---|---|---|---|---|
| 5,544,332 | A | * | 8/1996 | Chen .......................... 710/108 |
| 5,632,021 | A | * | 5/1997 | Jennings et al. ............ 710/312 |
| 5,978,938 | A | * | 11/1999 | Kaiser et al. ................. 714/48 |
| 6,292,488 | B1 | * | 9/2001 | Filgate ........................ 370/401 |
| 6,311,296 | B1 | * | 10/2001 | Congdon ..................... 714/56 |
| 6,490,644 | B1 | * | 12/2002 | Hyde et al. .................. 710/125 |
| 6,553,512 | B1 | * | 4/2003 | Gibson ......................... 714/17 |
| 6,665,818 | B1 | * | 12/2003 | Dickey et al. ................ 714/32 |
| 6,854,053 | B1 | * | 2/2005 | Burkhardt et al. ............. 713/2 |
| 2002/0099892 | A1 | * | 7/2002 | Olarig ......................... 710/240 |

FOREIGN PATENT DOCUMENTS

| | | |
|---|---|---|
| JP | A 63-193254 | 8/1988 |
| JP | A 7-49817 | 2/1995 |
| JP | 9-251439 | 9/1997 |
| JP | A 9-325912 | 12/1997 |
| JP | 10-293744 | 11/1998 |
| JP | A 10-293744 | 11/1998 |
| JP | P2000-163366 A | 6/2000 |
| JP | 2000-259555 | 9/2000 |

OTHER PUBLICATIONS

Japanese Office Action dated Oct. 13, 2004 (with partial English translation).

* cited by examiner

*Primary Examiner*—Scott Baderman
(74) *Attorney, Agent, or Firm*—McGinn IP Law Group, PLLC

(57) ABSTRACT

In a computer system, which makes an error detectable in case plural PCI target devices respond in one PCI cycle and the PCI protocol has become illicit, a processor 1 is connected over a PCI bus 10 to plural PCI devices a 100 to d 130, each of which activates corresponding target operating signal a 20 to d 50 respectively when operating as a PCI target device. The PCI bus monitor circuit 200 monitors the target address of a command executed on the PCI bus 10 and the target operating signals a 20 to d 50 from the plural PCI devices a 100 to d 130. If plural PCI target devices have responded for one PCI cycle, the PCI bus monitor circuit 200 sends an error report signal 210 to the processor unit 1.

30 Claims, 17 Drawing Sheets

SYSTEM FOR FACILITATED ANALYSIS OF PCI BUS MALFUNCTION

FIELD OF THE INVENTION

This invention relates to a system for enabling facilitated analysis of malfunction in a PCI (Peripheral Component Interconnect) bus and, more particularly, to a system in a computer device in which a processor unit is connected over the PCI bus to a plural number of PCI devices. Meanwhile, the specification for the PCI bus is prescribed in detail in PCI Local Bus Specification Revision 2.1, referred to below as PCI bus specification.

BACKGROUND OF THE INVENTION

Up to now, as error detection means for a computer device having a PCI bus, there were provided a method of asserting a SERR (System ERRor) signal on detection of a parity error of an address, a method of asserting PERR (Parity ERRor) on detection of a parity error of a data, and a method of terminating a transfer by a target abort on detection of other errors by a PCI target device.

SUMMARY OF THE DISCLOSURE

However, these conventional methods suffer from the following drawbacks:

A first problem is that the above-mentioned error detection means all operate satisfactorily when the operation on a PCI bus is conducted correctly in accordance with the PCI protocol, and hence, if, due to troubles and like in the PCI devices, two or more PCI target devices respond in one PCI cycle, and the PCI protocol has become illicit, the probability is high that the error detection means cannot detect error. Moreover, illicitness in the PCI protocol tends to lead to a deadlock on the PCI bus to cause serious malfunction in a computer device employing the PCI bus as a system bus.

A second problem is that, even if a PCI master device could detect the occurrence of error of some sort on the PCI bus in such a case mentioned above and inform a processor of the error, it is extremely difficult to locate the cause of the error.

Accordingly, it is an object of the present invention to provide a system for enabling facilitated analysis of malfunction in a PCI bus in which error detection is enabled even when plural PCI targets respond to one PCI cycle and the PCI protocol has become illicit.

It is another object of the present invention to provide a system for enabling facilitated analysis of malfunction in a PCI bus in which a cause of an error can be located on error detection such as when the PCI protocol has become illicit.

Among prior-art technical materials pertinent to the PCI bus, there are, for example, JP Patent Kokai JP-A-2000-259555, JP Patent Kokai JP-A-09-251439 and JP Patent Kokai JP-A-10-293744. However, these are not relevant to analysis of malfunction in the PCI bus.

The above and other objects of the invention are satisfied, at least in part, by providing a system for enabling facilitated analysis of malfunction in a PCI bus, arranged in a computer device in which a processor unit is connected over a PCI bus to a plural number of PCI devices, includes said plural PCI devices, each of which, when operating as a PCI target device, activates a corresponding target operating signal; and a PCI bus monitor circuit for monitoring target address of a command executed on said PCI bus and said target operating signals from said plural PCI devices, said PCI bus monitor circuit sending an error report signal to said processor unit when plural PCI target devices respond for one PCI cycle.

In the system for enabling facilitated analysis of malfunction in the PCI bus, in accordance with the present invention, the PCI bus monitor circuit includes an address storage circuit for snooping the operation of said PCI bus at the time of booting said computer device to store address values and size(memory size) values of said plural PCI devices in association with the target operating signals; an address latch circuit for storing temporarily the target address on said PCI bus; a target device selection circuit for specifying the PCI target device based on the base address values and size values of the plural PCI devices stored in said address storage circuit and on the target address temporarily stored in said address latch circuit; a target comparator circuit for comparing a result of said target device selection circuit and states of said target operating signals and for detecting that plural PCI target devices have responded for one PCI cycle; and an error status circuit for storing the result of said target device selection circuit and plural target operating signals from said target comparator circuit activated for one PCI cycle to report to said processor unit that plural PCI target devices have responded for one PCI cycle as an error report signal.

In the system for enabling facilitated analysis of malfunction in the PCI bus, in accordance with further aspect of the present invention, the PCI bus monitor circuit includes an address storage circuit, in which base address values and size values of said plural PCI devices in association with the target operation signals are stored by the processor unit at the time of booting said computer device; an address latch circuit for storing temporarily the target address on said PCI bus; a target device selection circuit for specifying the PCI target device based on the base address values and size values of the plural PCI devices stored in said address storage circuit and on the target address temporarily stored in said address latch circuit; a target comparator circuit for comparing a result of the target device selection circuit and states of said target operating signals and for detecting that plural PCI target devices have responded for one PCI cycle; and an error status circuit for storing the result of said target device selection circuit and plural target operating signals from said target comparator circuit activated for one PCI cycle to report to said processor unit that plural PCI target devices have responded for one PCI cycle as an error report signal.

A system for enabling facilitated analysis of malfunction in a PCI bus, arranged in a computer device in which a processor unit is connected over a PCI bus to a plural number of PCI devices, in accordance with another aspect of the present invention, includes said plural PCI devices, each of which, when operating as a PCI target device, activates corresponding target operating signal; and a PCI bus monitor circuit for monitoring target address of a command executed on said PCI bus and said target operating signals from said plural PCI devices, said PCI bus monitor circuit including means for resetting said PCI bus when plural PCI target devices respond for one PCI cycle.

In the system for enabling facilitated analysis of malfunction in the PCI bus, in accordance with the present invention, the PCI bus monitor circuit includes an address storage circuit for snooping the operation of said PCI bus at the time of booting said computer device to store base address values and size values of said plural PCI devices in association with the target operating signals; an address latch circuit for storing temporarily the target address on said PCI bus; a target device selection circuit for specifying the PCI target device based on the base address values and size values of the plural PCI devices stored in said address storage circuit and on the target address temporarily stored in said address latch circuit; a target comparator circuit for comparing a result of said target device selection circuit and states of said target operating signals and for detecting that plural PCI target devices have responded for one PCI cycle; an error status circuit for storing the result of said target device selection circuit and plural target operating signals from said target comparator circuit activated for one PCI cycle; and a PCI reset generating circuit for executing reset operation of said PCI bus with contents of said error status circuit being held by the PCI reset generating circuit to reset all of the PCI devices connected to said PCI bus.

In the system for enabling facilitated analysis of malfunction in the PCI bus, in accordance with the present invention, the PCI bus monitor circuit includes an address storage circuit, in which base address values and size values of said plural PCI devices in association with the target operation signals are stored by the processor unit at the time of booting said computer device; an address latch circuit for storing temporarily the target address on said PCI bus; a target device selection circuit for specifying the PCI target device based on the base address values and size values of the plural PCI devices stored in said address storage circuit and on the target address temporarily stored in said address latch circuit; a target comparator circuit for comparing a result of the target device selection circuit and states of said target operating signals and for detecting that plural PCI target devices have responded for one PCI cycle; an error status circuit for storing the result of said target device selection circuit and plural target operating signals from said target comparator circuit activated for one PCI cycle; and a PCI reset generating circuit for executing reset operation of said PCI bus with contents of said error status circuit being held by the PCI reset generating circuit to reset all of the PCI devices connected to said PCI bus.

A system for enabling facilitated analysis of malfunction on a PCI bus, arranged in a computer device in which a processor unit is connected over the PCI bus to a plural number of PCI devices, in accordance with further aspect of the present invention, includes said processor unit activating corresponding target operating signal when operating as a PCI target device; said plural PCI devices, each of which, when operating as a PCI target device, activates corresponding target operating signal; and a PCI bus monitor circuit for monitoring target address of a command executed on said PCI bus and the target operating signals from said processor unit and from said plural PCI devices, said PCI bus monitor circuit sending an error report signal to said processor unit when plural PCI target devices have responded for one PCI cycle.

In the system for enabling facilitated analysis of malfunction in the PCI bus, according to the present invention, the PCI bus monitor circuit includes an address storage circuit for snooping the operation of said PCI bus at the time of booting said computer device to store base address values and size values of said plural PCI devices in association with the target operating signals; an address latch circuit for storing temporarily the target address on said PCI bus; a target device selection circuit for specifying the PCI target device based on the base address values and size values of the plural PCI devices stored in said address storage circuit and on the target address temporarily stored in said address latch circuit; a target comparator circuit for comparing a result of said target device selection circuit and states of said target operating signals and for detecting that plural PCI target devices have responded for one PCI cycle; and an error status circuit for storing the result of said target device selection circuit and plural target operating signals from said target comparator circuit activated for one PCI cycle to report to said processor unit that plural PCI target devices have responded for one PCI cycle by way of the error report signal.

In the system for enabling facilitated analysis of malfunction in the PCI bus, according to the present invention, the PCI bus monitor circuit includes an address storage circuit, in which base address values and size values of said plural PCI devices in association with the target operation signals are stored by the processor unit at the time of booting said computer device; an address latch circuit for storing temporarily the target address on said PCI bus; a target device selection circuit for specifying the PCI target device based on the base address values and size values of the plural PCI devices stored in said address storage circuit and on the target address temporarily stored in said address latch circuit; a target comparator circuit for comparing the result of said target device selection circuit and states of said target operating signals and for detecting that plural PCI target devices have responded for one PCI cycle; and an error status circuit for storing the result of said target device selection circuit and plural target operating signals activated for one PCI cycle to report to said processor unit that plural PCI target devices have responded for one PCI cycle by way of the error report signal.

A system for enabling facilitated analysis of malfunction on a PCI bus, arranged in a computer device in which a processor unit is connected over the PCI bus to a plural number of PCI devices, in accordance with another aspect of the present invention, includes said processor unit activating corresponding target operating signal when operating as a PCI target device; said plural PCI devices, each of which, when operating as a PCI target device, activates corresponding target-operating signal; and a PCI bus monitor circuit for monitoring target address of a command executed on said PCI bus and said target operating signals from said plural PCI devices, said PCI bus monitor circuit including means for resetting said PCI bus when plural PCI target devices respond for one PCI cycle.

In the system for enabling facilitated analysis of malfunction in the PCI bus, according to the present invention, the PCI bus monitor circuit includes an address storage circuit for snooping the operation of said PCI bus at the time of booting said computer device to store base address values and size values of said plural PCI devices in association with the target operating signals; an address latch circuit for storing temporarily the target address on said PCI bus; a target device selection circuit for specifying the PCI target device based on the base address values and size values of said processor unit and the plural PCI devices stored in said address storage circuit and on the target address temporarily stored in said address latch circuit; a target comparator circuit for comparing a result of said target device selection circuit and states of said target operating signals and for detecting that plural PCI target devices have responded for one PCI cycle; an error status circuit for storing the result of said target device selection circuit and plural target operating signals from said target comparator circuit activated for one PCI cycle; and a PCI reset generating circuit for executing reset operation of said PCI bus with contents of said error status circuit being held by the PCI reset generating circuit to reset all of the PCI devices connected to said PCI bus.

In the system for enabling facilitated analysis of malfunction in the PCI bus, according to the present invention, the PCI bus monitor circuit includes an address storage circuit, in which base address values and size values of said plural PCI devices in association with the target operation signals are stored by the processor unit at the time of booting said computer device; an address latch circuit for storing temporarily the target address on said PCI bus; a target device selection circuit for specifying the PCI target device based on the base address values and size values of said processor unit and the plural PCI devices stored in said address storage circuit and on the target address temporarily stored in said address latch circuit; a target comparator circuit for comparing the result of the target device selection circuit and states of said target operating signals and for detecting that plural PCI target devices have responded for one PCI cycle; an error status circuit for storing the result of said target device selection circuit and plural target operating signals from said target comparator circuit activated for one PCI cycle; and a PCI reset generating circuit for executing reset operation of said PCI bus with contents of said error status circuit held by the PCI reset generating circuit to reset all of the PCI devices connected to said PCI bus.

In a system for enabling facilitated analysis of malfunction in the PCI bus, according to the present invention, the processor unit includes a micro-processor, a host bridge and a memory, and the target operating signal is sent from the host bridge to the PCI bus monitor circuit.

In a system for enabling facilitated analysis of malfunction in the PCI bus according to the present invention, there is preferably provided a target operating signal which is activated when the PCI device, connected to the PCI bus, operates as a PCI target device, and by monitoring the target operating signal, responses from plural PCI target devices for one PCI cycle, which are produced e.g., due to malfunction of a base address register of a specified PCI device, may be detected to provide for facilitated identification of a PCI device which inherently ought not to respond as the PCI target device.

Referring to FIG. 1, in accordance with the present invention, a PCI bus monitor circuit 200 preferably stores the base address set from the processor unit 1 to the PCI devices a 100 to d 130 when the computer device is booted. If subsequently the communication is to occur on the PCI bus 10, the target address output from a PCI master device is snooped and analyzed to identify the PCI target device with which the PCI master device is about to communicate. The PCI bus monitor circuit 200 receives target operating signals a 20 to d 50, activated during operation of the PCI devices a 100 to d 130 as PCI target devices and is able to detect the PCI target devices which have responded on a request from the PCI master device. Thus, if plural target operating signals are received by the PCI bus monitor circuit 200, it may be determined that an erroneous response has occurred from a PCI device which inherently ought not to respond as the PCI target device, while the PCI device which made erroneous response can be identified, so that, from these result, the malfunction can be analyzed readily.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

In the following, preferred embodiments of the present invention will be explained in detail with reference to the drawings for illustrating the preferred embodiments of the present invention.

Figure 1:
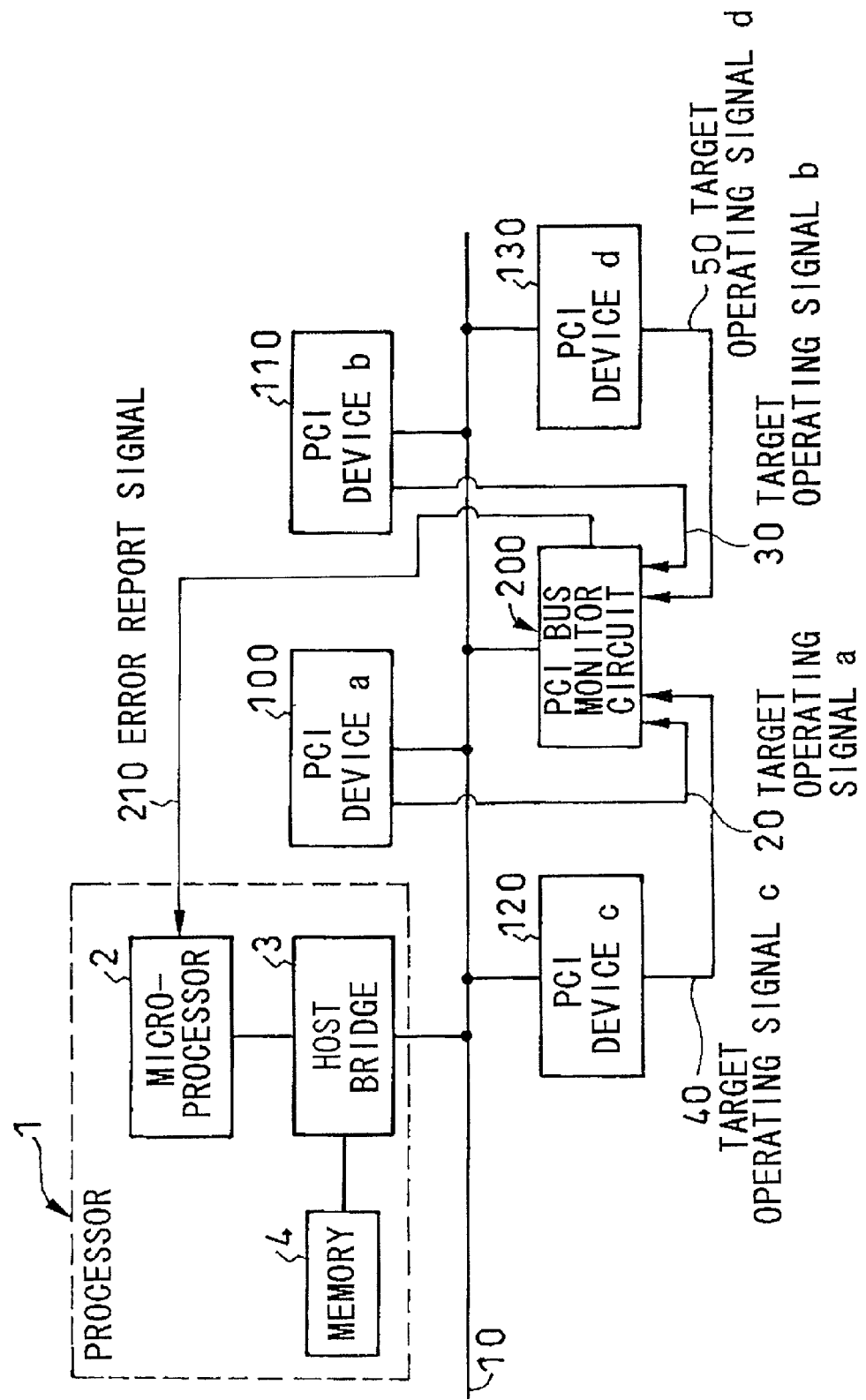
FIG. 1 is a circuit block diagram showing the structure of a system for enabling facilitated analysis of malfunction in the PCI bus according to a first embodiment of the present invention.

FIG. 1 is a block circuit diagram showing the structure of a system for enabling facilitated analysis of malfunction in a PCI bus according to a first embodiment the present invention. Referring to FIG. 1, the system for enabling facilitated analysis of malfunction in a PCI bus according to the first embodiment of the present invention, includes a processor 1, a PCI bus 10, a plural number of PCI devices, that is PCI device a 100 to a PCI device d 130, operating under control from the processor unit 1, and a PCI bus monitor circuit 200 for monitoring a target address of a command executed on the PCI bus 10 and the operating states as the PCI target devices of the PCI devices a 100 to d 130.

The processor unit 1 is made up of a micro-processor 2 which issues a command, a host bridge 3 which interconnects the microprocessor 2 and the PCI bus 10, and a memory 4 used as a microprogram storage area and as a work area for the micro-processor 2.

The processor unit 1 sets a base address, by way of initializing PCI devices a 100 to d 130 at the time when the computer device is booted, and issues a command to the PCI device a 100 to PCI device d 130, after the computer device is booted, for performing control operations, such as transfer operation using the PCI bus.

The PCI device a 100 to PCI device d 130 respectively executes process in each PCI device and executes data transfer with other PCI device, based on commands issued from the processor unit 1. In case data transfer is executed on the PCI bus 10, the PCI devices a 100 to d 130, operating as PCI target devices, activate target operating signals a 20 to d50 respectively. The other operation of data transfer and the like over the PCI bus 10 are as stated in the PCI bus specification.

A more detailed structure of a PCI bus monitor circuit 200 will be described in the below.

Figure 2:
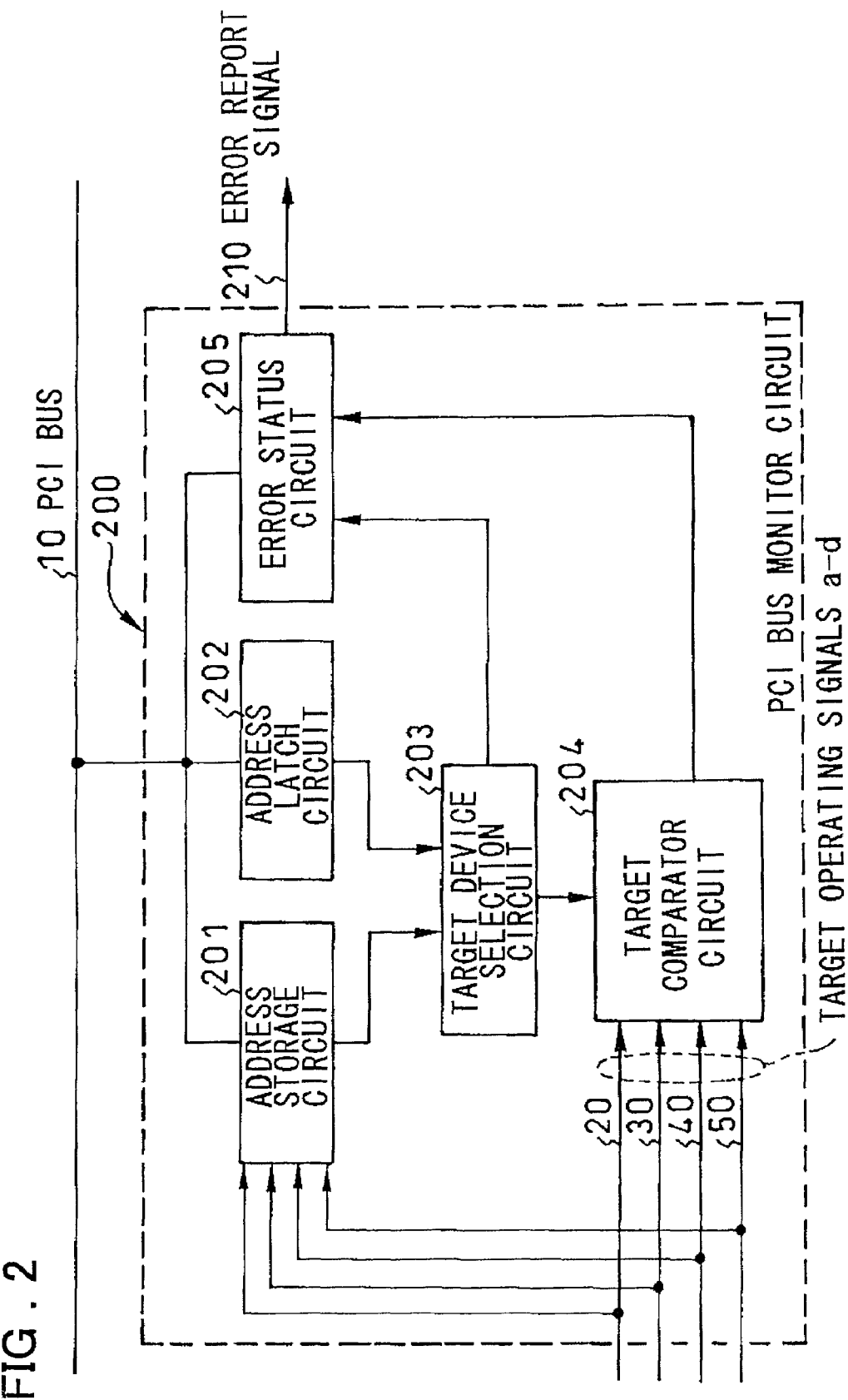
FIG. 2 is a circuit block diagram showing a more detailed structure of a PCI bus monitor circuit shown in FIG. 1.

FIG. 2 is a circuit block diagram showing a more detailed structure of a PCI bus monitor circuit 200. Referring to FIG. 2, the PCI bus monitor circuit 200 is made up of an address storage circuit 201, an address latch circuit 202, a target device selection circuit 203, a target comparator circuit 204 and an error status circuit 205.

The address storage circuit 201 stores the base address values and size values of the PCI devices a 100 to d 130 respectively when the computer device undergoes a boot operation.

The address latch circuit 202 monitors PCI bus operation executed on the PCI bus 10 to store temporarily target address being executed.

Based on the base address values and the size values of the PCI devices a 100 to d 130, stored in the address storage circuit 201, the target device selection circuit 203 specifies the PCI target device, the access request to which is being issued by the PCI master device.

The target comparator circuit 204 compares the result of the target device selection circuit 203 with a target-operating signal a 20 to a target operating signal a 50.

The error status circuit 205 has the functions of storing, when a plural number of target operating signals have become active for one PCI cycle, the result of the target device selection circuit 203 and the target operating signals which have become active, and of informing the processor unit 1 of an error by an error report signal 210.

Figure 3:
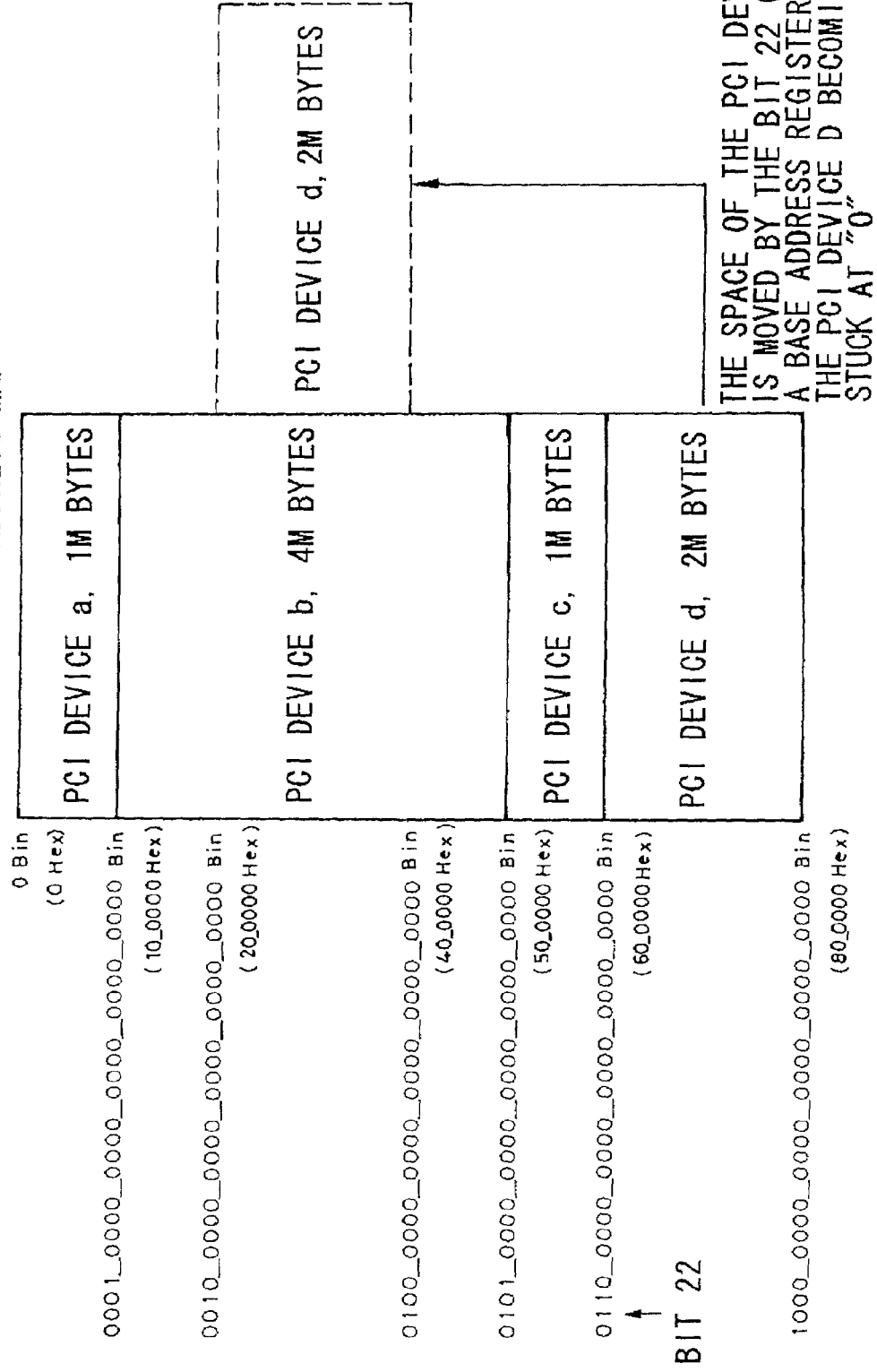
FIG. 3 shows an instance of a memory space address map of a PCI device created by a processor shown in FIG. 1.

FIG. 3 shows an example of an address map of the memory space of the PCI devices a 100 to d 130, which is created by the processor unit 1. In an example, shown in FIG. 3, the base address values and memory size values allocated for plural PCI devices a, b, c, and d are, OH and 1 Mbytes, 100000H and 4 Mbytes, 500000H and 1 Mbytes, and 600000H and 2 Mbytes respectively where H designates a hexadecimal representation.

Figure 4:
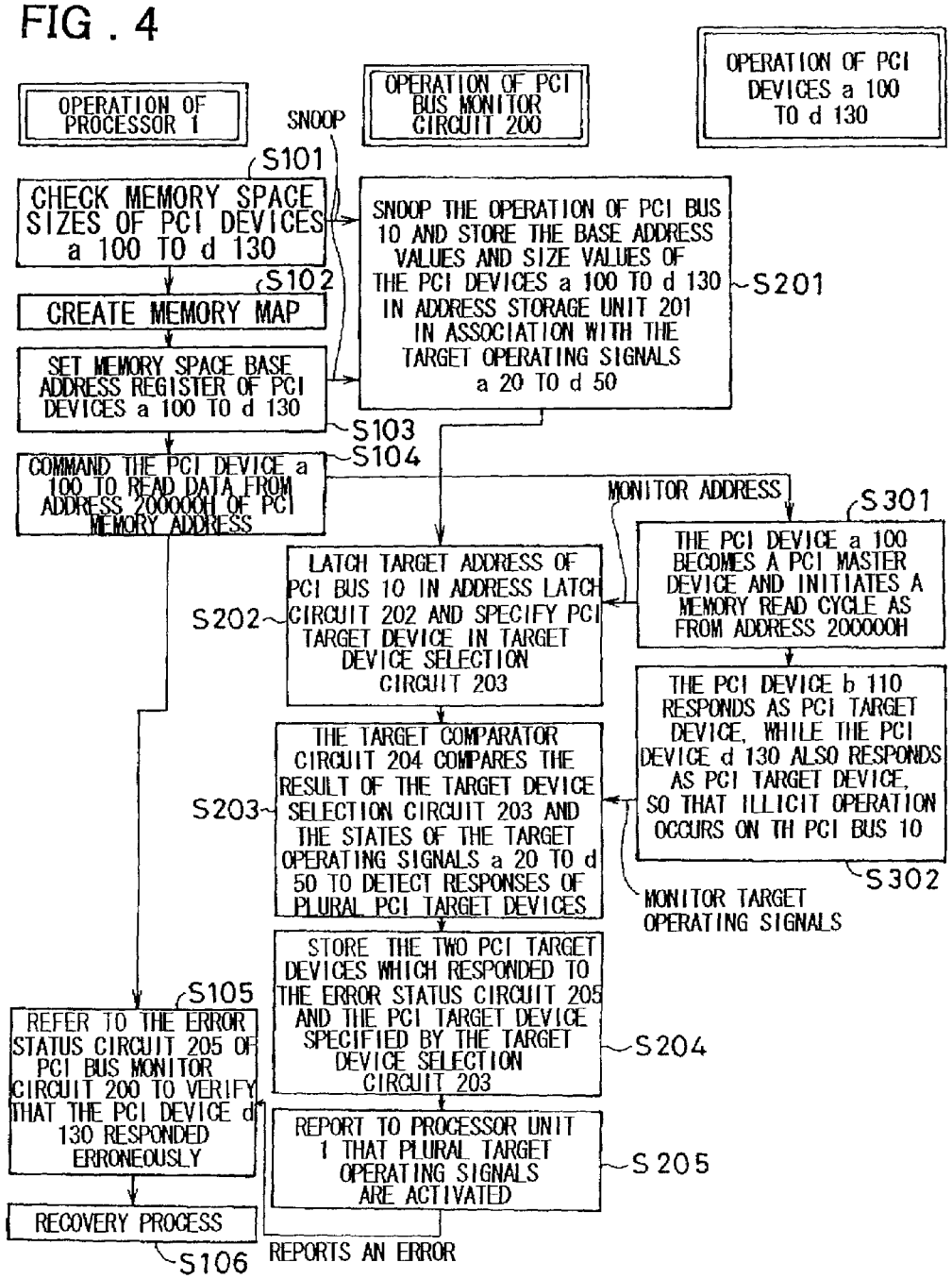
FIG. 4 is a flowchart showing a processing instance of the system for enabling facilitated analysis of malfunction in the PCI bus according to the first embodiment.

FIG. 4 shows a schematic flow of operations in a case where a mistaken response has occurred from the PCI device d 130 when, after the processor unit 1 has initialized the PCI devices a 100 to d 130, the PCI device a 100 has executed a readout operation from the memory space of the PCI device b 110 under a command from the processor unit 1. Steps S101 to S103 in FIG. 4 represent the initializing operations.

Referring to FIGS. 1 to 4, the operation of the system for enabling facilitated analysis of malfunction in a PCI bus in the first embodiment of the present invention, which is configured as described above, is now explained.

First, the processor unit 1 checks the requested size of the memory space of the PCI devices a 100 to d 130 (step S101 of FIG. 4). In this embodiment of the present invention, the checking of the requested size of the memory space may be performed in the same manner as stated in the PCI bus specification.

The processor unit 1 then creates an address map of the PCI memory space (step S102 of FIG. 4) and sets a value in a memory space base address register, not shown, provided for each of the PCI devices a 100 to d 130, in accordance with the created address map of the PCI memory space (step S103 of FIG. 4).

At this time, the PCI bus monitor circuit 200 snoops the operation on the PCI bus 10 and stores the base address values and size(memory size) values of the PCI devices a 100 to d 130, in association with the corresponding target operating signals a 20 to d 50 (step S201 of FIG. 4). Those described above constitute the initialization operations.

If the processor unit 1 commands the PCI device a 100 to 'read out data from an address 200000H of the PCI memory address space' (step S104 of FIG. 4), the PCI device a 100, as a PCI master device, outputs an address of 200000H, along with a memory read command, to the PCI bus 10, and then waits for a response from the PCI target device (step S301 of FIG. 4).

In the PCI bus monitor circuit 200, the address latch circuit 202 temporarily stores a target address on the PCI bus 10. The target device selection circuit 203, based on the base address values and the size values of the PCI devices a 100 to d 130, stored in the address storage circuit 201, specifies that the PCI target device associated with the target address on the PCI bus 10 is the PCI device b 110 (step S202 of FIG. 4). In a normal state, free of malfunction, the PCI device b 110 responds as a PCI target device and the transfer over the PCI bus 10 is terminated as normally.

The operation in which a bit 22 of the memory space base address register of the PCI device d 130 has become stuck-at-"0" due to a malfunction is now explained.

Referring to FIG. 3, the PCI device d 130, which should normally be allocated to the address range of 600000H to 7FFFFFH on the PCI memory space, operates as if it is allocated to the address range of 200000H to 3FFFFFH, due to memory space movement caused by the malfunction, i.e., the stuck-at-"0" fault of the bit 22 in the memory space base address register of the PCI device d 130.

The operation up to the steps S301 and S202 in FIG. 4 is the same as the above-described operation.

The PCI device b 110 responds as a PCI target device, whilst the PCI device d 130 also responds at the same time as or at a different timing from this response timing as a PCI target device to the PCI device a 100(step S302 of FIG. 4).

As the result of step S302, the protocol on the PCI bus 10 becomes illicit.

In the PCI bus monitor circuit 200, the target comparator circuit 204 monitors the target operating signals a 20 to d 50, and detects that the target operating signals b 30 and d 50 have been activated simultaneously, while detecting that plural responses have occurred from plural PCI target devices for a given PCI cycle (step S203 of FIG. 4).

The target comparator circuit 204 then memorizes, in the error status circuit 205, that both the target operating signals b 30 and d 50 have become active, while memorizing that the PCI target device specified from the target device selection circuit 203 is the PCI device b 110 (step S204 of FIG. 4).

The error status circuit 205 then interrupts to the processor unit 1 to inform the processor unit 1 by the error report signal 210 of the fact that responses from plural PCI target devices are observed for one PCI cycle(step S205 of FIG. 4).

The processor unit 1 refers to the error status circuit 205 of the PCI bus monitor circuit 200, over the PCI bus 10, and memorizes that the target operating signals b 30 and d 50 have become active. Moreover, since the PCI target device specified by the target device selection circuit 203 is the PCI device b 110, the processor unit 1 decides that the PCI device d 130 has made an erroneous response (step S105 of FIG. 4).

The processor unit 1 then executes an error recovery process (step S106 of FIG. 4).

Thus, by referring to the base address values and size values of the PCI devices a 100 to d 130, stored in the address storage circuit 201 at the time of the initialization setting, and by monitoring the target operating signals a 20 to d 50, it can be detected that the two PCI devices b 110 and d 130 have responded as PCI target devices to one PCI cycle. It can also be detected that this malfunction is caused by the problem associated with the PCI device d 130.

In the description of operations mentioned above, the operation during the read time of the PCI memory space is taken as an example. Alternatively, error detection may also be possible, even in the PCI I/O space, by storing the information in an address storage space 201 at the time of the initialization setting. On the other hand, detection of the command responded to by the PCI target device during the time excluding the configuration cycle might also be possible.

Thus, in the first embodiment of the present invention, the analysis of malfunction in case plural PCI target devices have responded for one PCI cycle on the PCI bus 10 can be conducted readily and reliably.

Figure 5:
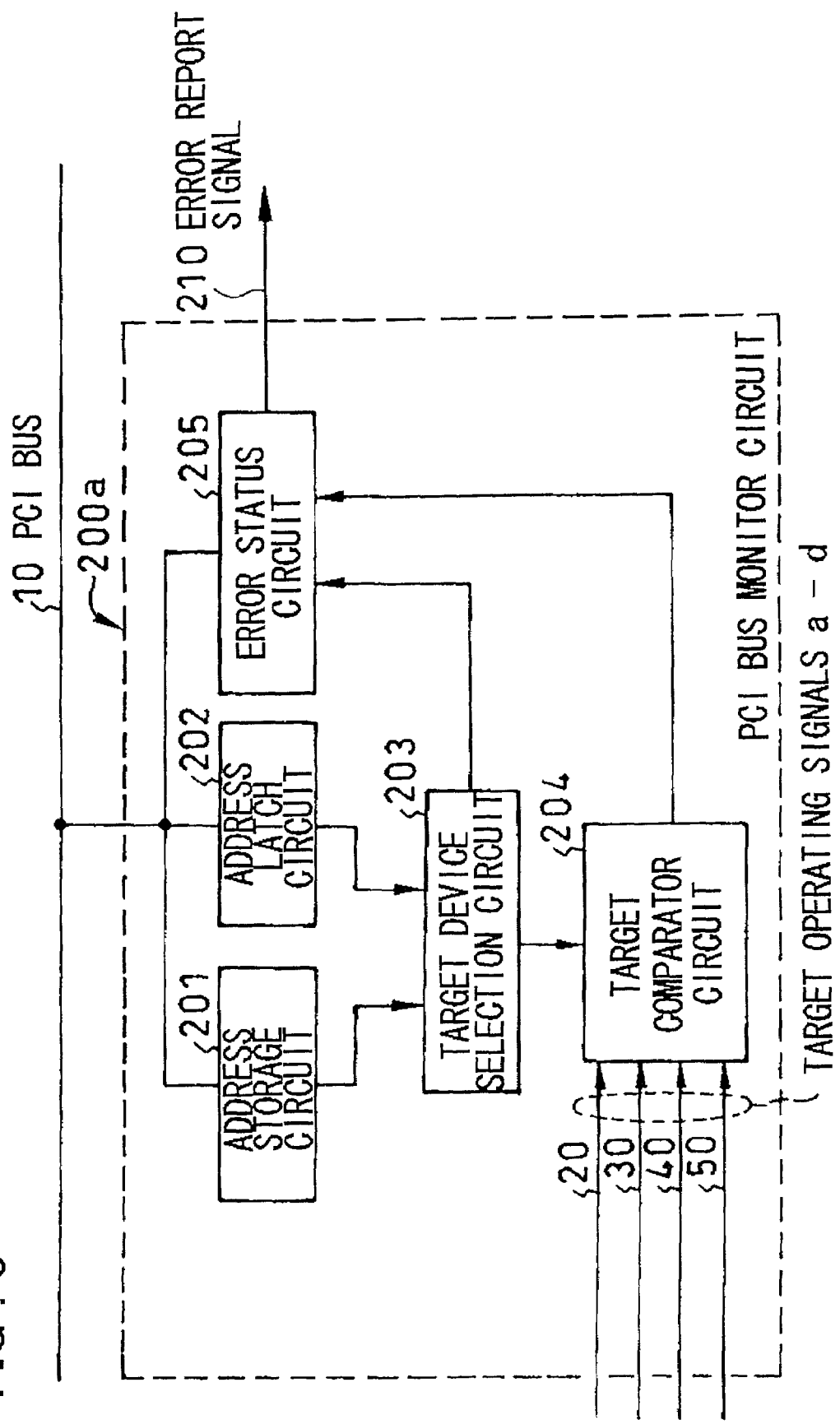
FIG. 5 is a circuit block diagram showing the structure of the PCI bus monitor circuit in a system for enabling facilitated analysis of malfunction in the PCI bus according to a second embodiment of the present invention.

FIG. 5 shows a circuit block diagram showing the structure of a PCI bus monitor circuit 200a in the system for enabling facilitated analysis of malfunction in a PCI bus according to a second embodiment of the present invention. Referring to FIG. 5, the PCI bus monitor circuit 200a according to the second embodiment is made up of an address storage circuit 201, an address latch circuit 202, a target device selection circuit 203, a target comparator circuit 204 and an error status circuit 205. In the PCI bus monitor circuit 200a according to the second embodiment in distinction from the PCI bus monitor circuit 200 according to the first embodiment, shown in FIG. 2, the target operating signals a 20 to d 50 are not supplied to the address storage circuit 201.

Figure 6:
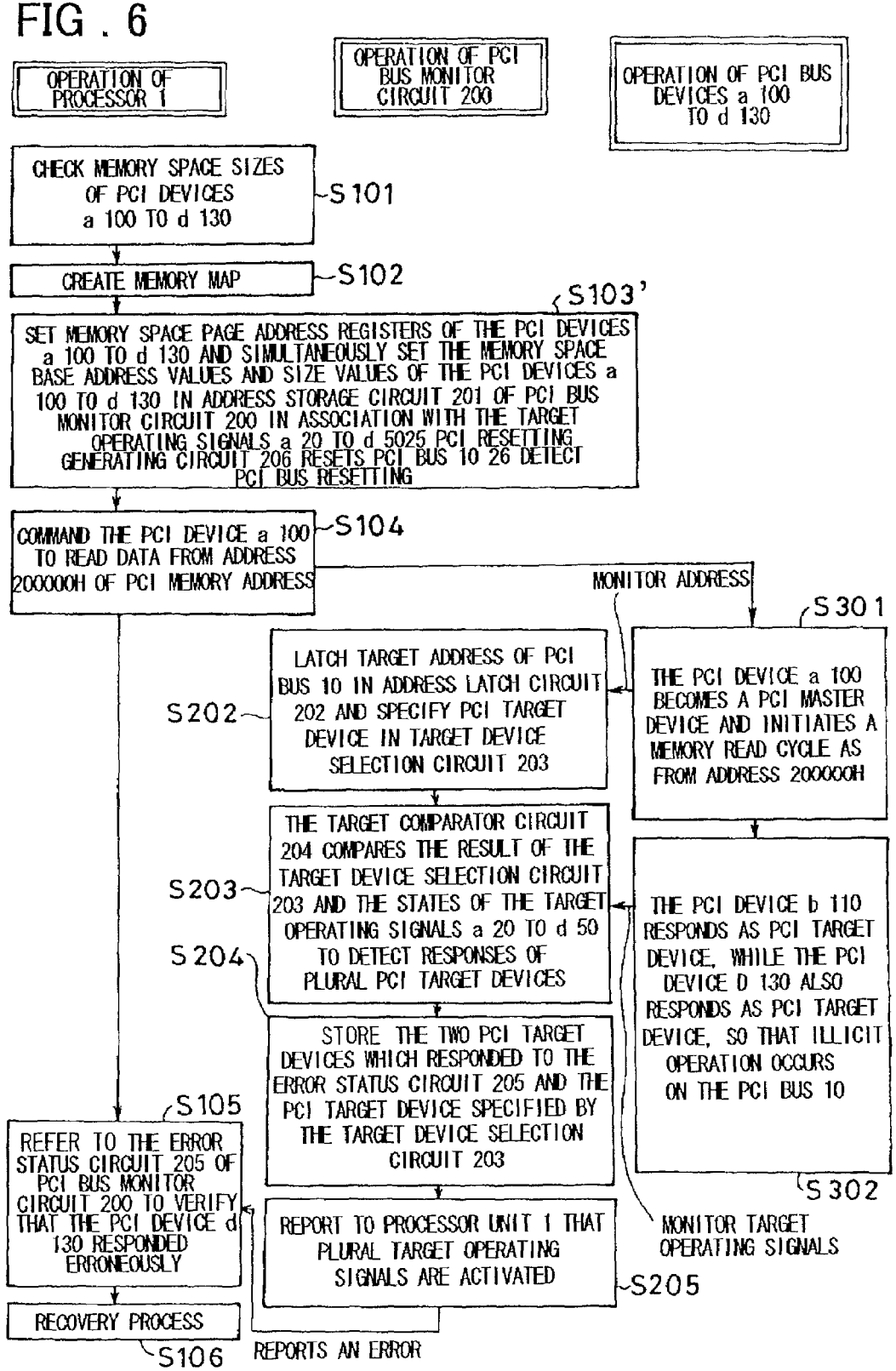
FIG. 6 is a flowchart showing a processing instance of the PCI bus monitor circuit in the system for enabling facilitated analysis of malfunction in the PCI bus according to the second embodiment of the present invention.

FIG. 6 is a flowchart showing a processing instance of the system for enabling facilitated analysis of malfunction in the PCI bus according to the second embodiment of the present invention. As compared with the processing of the system according to the first embodiment, shown in FIG. 4, the processing of the system in the present embodiment differs in that the step S103' is substituted for the step S103 and in that step S201 is deleted.

In the system for enabling facilitated analysis of malfunction in the PCI bus according to the second embodiment, the processor unit 1 sets the base address values and size values of the PCI devices a 100 to d 130, in the address storage circuit 201, in association with the target operation signals a 20 to d50 (step S103' of FIG. 6). This operation is distinct from that of the system according to the first embodiment in which the PCI bus monitor circuit 200 snoops the initializing operation of the processor unit 1 and in which the base address values and size values of the PCI devices a 100 to d 130 are stored in the address storage circuit 201 (step S201 of FIG. 4). In other respects, the operation of the second embodiment may be the same with that of the system of the first embodiment described above. Accordingly, the description of the steps other than step S103' in FIG. 6 is omitted.

In the system according to the second embodiment, there is no need to supply the target operating signals a 20 to d 50 to the address storage circuit 201, thus simplifying the circuitry of the PCI bus monitor circuit 200a advantageously as compared to the above-described first embodiment.

Figure 7:
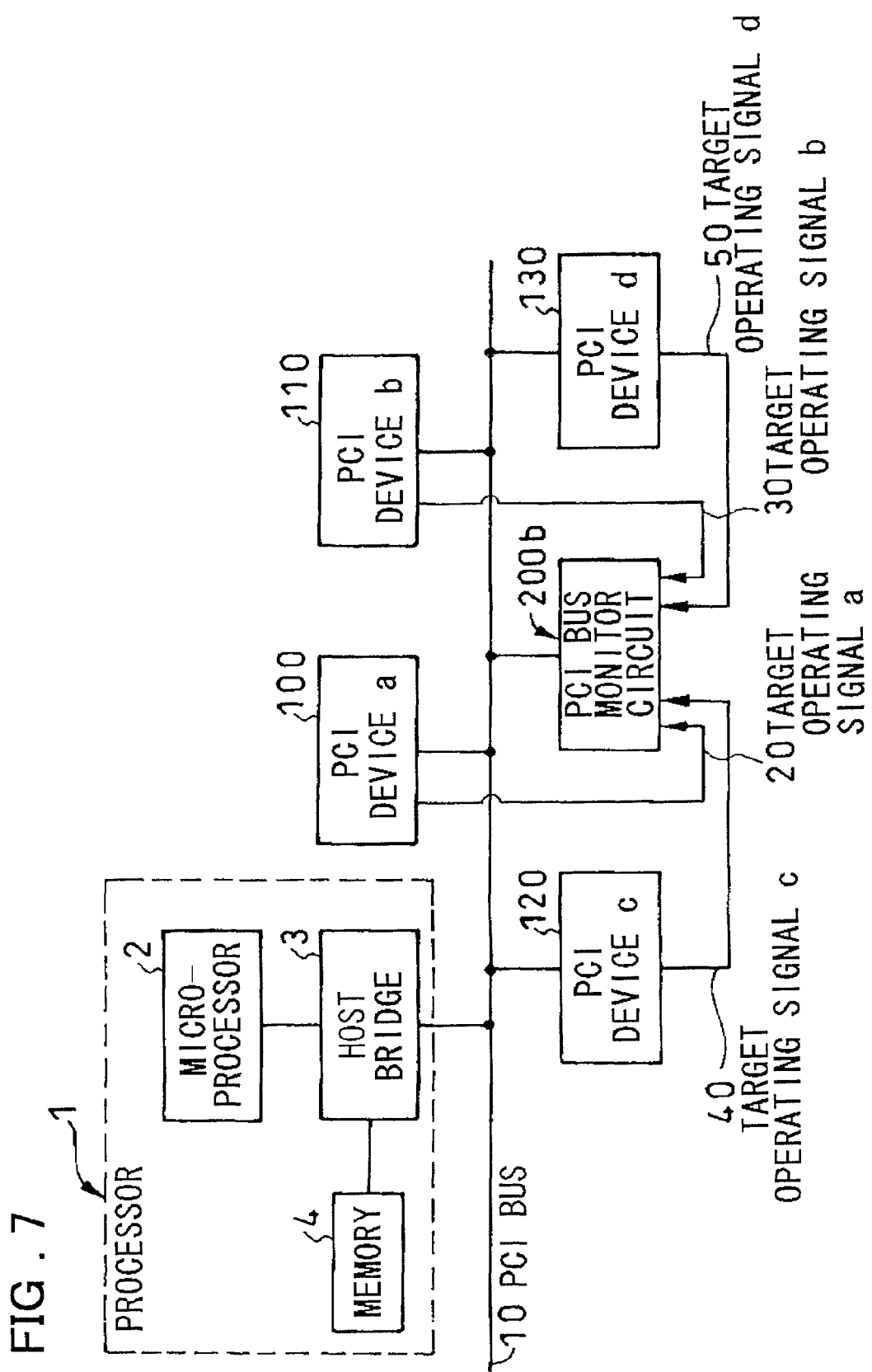
FIG. 7 is a circuit block diagram showing the structure of a system for enabling facilitated analysis of malfunction in the PCI bus according to a third embodiment of the present invention.

FIG. 7 is a circuit block diagram showing the structure of the system for enabling facilitated analysis of malfunction in the PCI bus according to a third embodiment of the present invention. As compared to the system according to the above described first embodiment, the system according to the third embodiment differs only in eliminating the error report signal 210 which is connected from the PCI bus monitor circuit 200 to the micro-processor 2 as shown in FIG. 1. Thus in the third embodiment, the PCI bus monitor circuit 200 in the first embodiment shown in FIG. 1. is changed to a PCI bus monitor circuit 200b as shown in FIG. 7.

Figure 8:
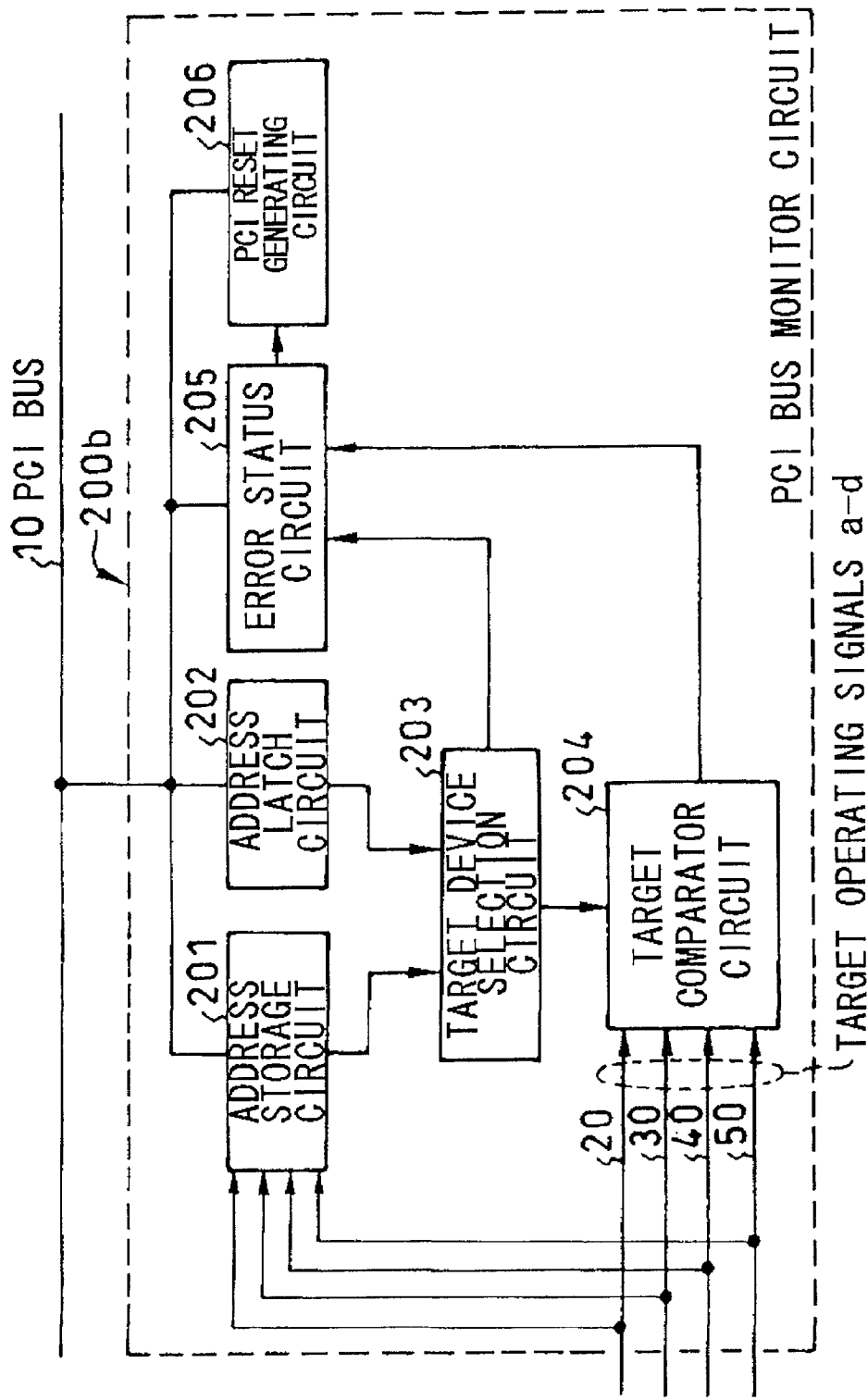
FIG. 8 is a circuit block diagram showing a more detailed structure of a PCI bus monitor circuit shown in FIG. 7.

FIG. 8 is a circuit block diagram showing a more detailed structure of the PCI bus monitor circuit 200b. Referring to FIG. 8, the PCI bus monitor circuit 200b is made up of an address storage circuit 201, an address latch circuit 202, a target device selection circuit 203, a target comparator circuit 204, an error status circuit 205, and PCI reset generating circuit 206 for executing an operation of PCI bus reset when the target operating signals of plural PCI devices are activated simultaneously. As compared to the PCI bus monitor circuit 200 of the system for enabling facilitated analysis of malfunction in the PCI bus according to the first embodiment, shown in FIG. 2, the PCI bus monitor circuit 200b differs in that a PCI reset generating circuit 206, which receives the result of the error status circuit 205 (the result is corresponding to the error report signal 210), is provided anew and the error report signal 210 is not output to outside of the PCI bus monitor circuit 200b. When a PCI bus reset is executed, the PCI bus 10 is reset to an initial state (bus idle state) and the register such as a configuration resister arranged in a PCI device is also reset.

Figure 9:
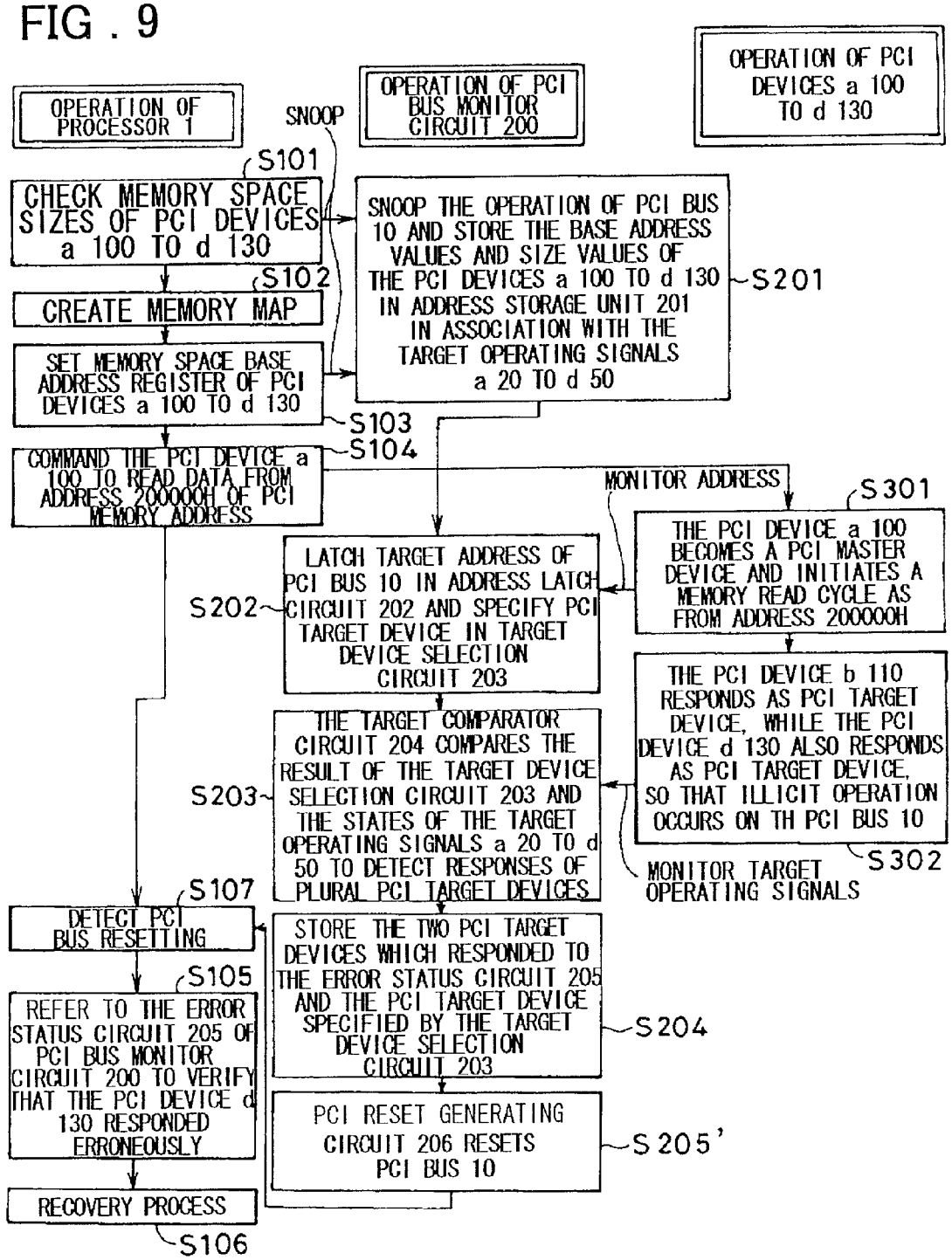
FIG. 9 is a flowchart showing a processing instance of the system for enabling facilitated analysis of malfunction in the PCI bus according to the third embodiment of the present invention.

FIG. 9 is a flowchart showing a processing instance of the system for enabling facilitated analysis of malfunction in the PCI bus according to the third embodiment of the present invention. The processing of the system in the third embodiment differs from that of the system according to the first embodiment, shown in FIG. 4, in that step S205' is substituted for step S205 and a step S107 is added.

In the system for enabling facilitated analysis of malfunction in the PCI bus according to the third embodiment, when the target operating signals of plural PCI devices are activated simultaneously, the reset operation of the PCI bus 10 is carried out by the PCI reset generating circuit 206 (step S205' of FIG. 9), while PCI reset generating circuit 206 is holding the contents of the error status circuit 205, and all of the PCI devices a 100 to d 130, which are connected to the PCI bus 10, are forced to be reset, in contradistinction from the system according to the first embodiment, in which, on a similar occasion, the processor unit 1 is interrupted and reported with the error report signal 210.

The processor unit 1 detects the reset of the PCI bus (step S107 of FIG. 9) and makes reference to the error status circuit 205 of the PCI bus monitor circuit 200, via the PCI bus 10, to memorise that the target operating signals b 30 and d 50 have become active. Since the PCI target device, as specified from the target device selection circuit 203, is the PCI device, the processor unit 1 determines that the PCI device d 130 has made an erroneous response (step S105 of FIG. 9) and subsequently executes an error recovery process (step S106 of FIG. 9).

Thus, in the third embodiment, even if the protocol on the PCI bus 10 becomes illicit because the plural PCI devices a 100 to d 130 responded simultaneously as the PCI target device, thus producing a deadlock state, the processor unit 1 is able to execute subsequent reference operation reliably to the error status circuit 205.

Figure 10:
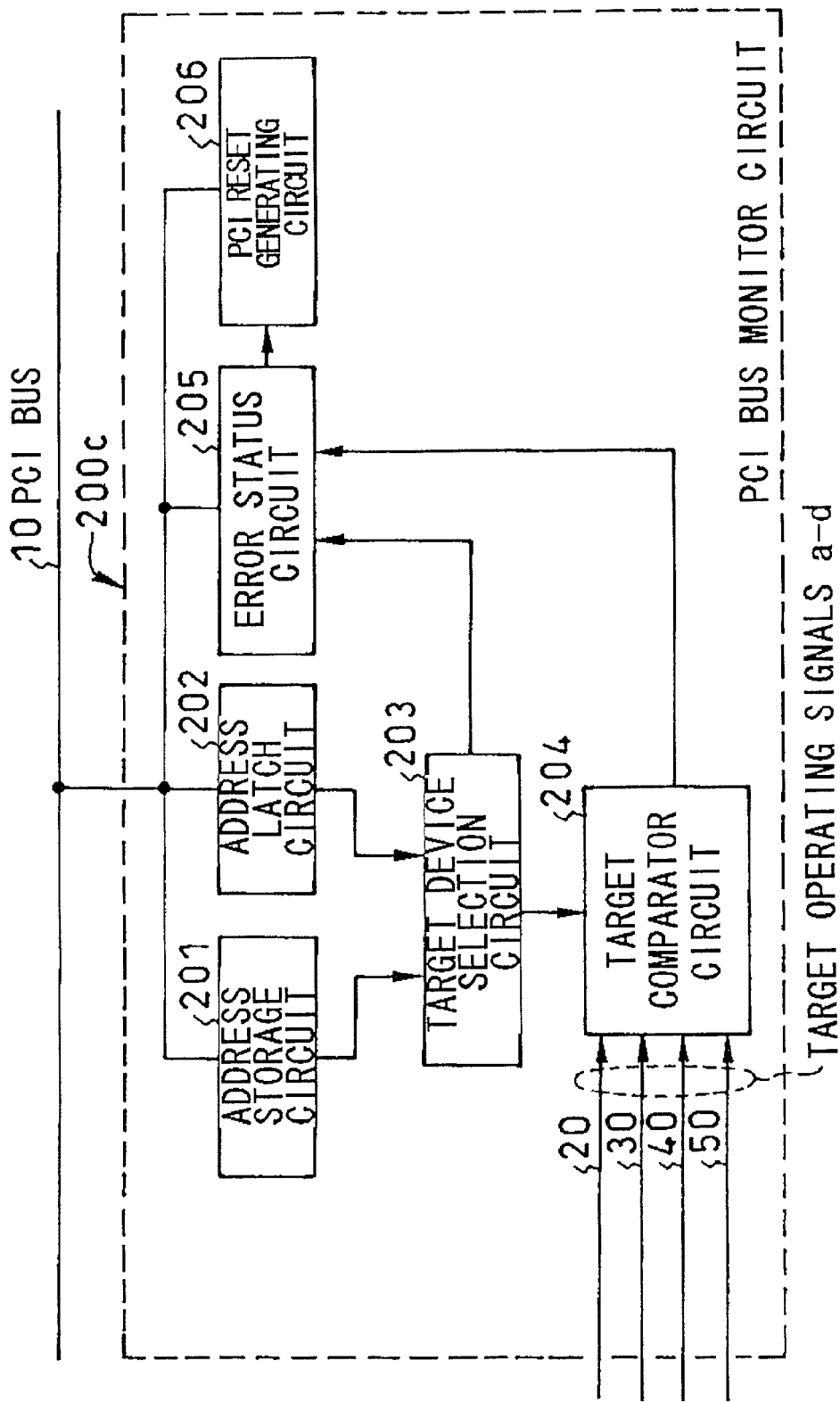
FIG. 10 is a circuit block diagram showing the structure of a PCI bus monitor circuit in a system for enabling facilitated analysis of malfunction in the PCI bus according to a fourth embodiment of the present invention.

FIG. 10 is a circuit block diagram showing the structure of a PCI bus monitor circuit 200c in the system for enabling facilitated analysis of malfunction in the PCI bus according to a fourth embodiment of the present invention. As compared to the PCI bus monitor circuit 200b in the system according to the third embodiment shown in FIG. 8, the PCI bus monitor circuit 200c according to the fourth embodiment differs only in that the target operating signals a 20 to d 50 are not supplied to the address storage circuit 201.

Figure 11:
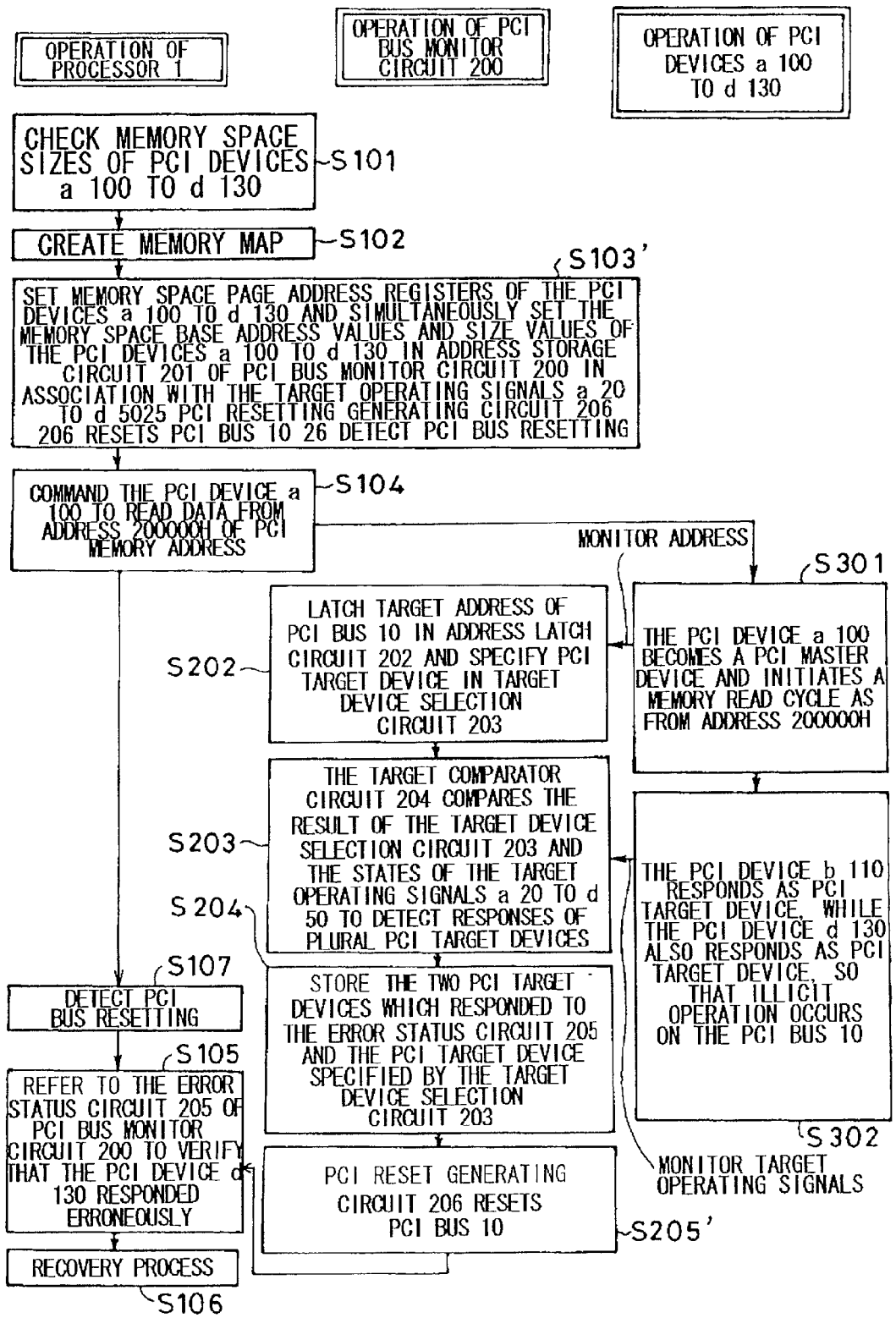
FIG. 11 is a flowchart showing a processing instance of the system for enabling facilitated analysis of malfunction in the PCI bus according to a fourth embodiment of the present invention.

FIG. 11 is a flowchart showing a processing instance of the system for enabling facilitated analysis of malfunction in the PCI bus according to the fourth embodiment of the present invention. As compared to the processing of the system according to the third embodiment, shown in FIG. 9, the processing of the system according to the fourth embodiment differs only in that the step S103' is substituted for step S103 and in that the step S201 is deleted.

In the system for enabling facilitated analysis of malfunction in the PCI bus according to the fourth embodiment, in contradistinction from the system according to the third embodiment in which the PCI bus monitor circuit 200b snoops the initializing operation of the processor unit 1 and the base address values and the size values of the PCI devices a 100 to d 130 are stored in the address storage circuit 201 (step S201 of FIG. 9), the processor unit 1 sets the base address values and size values of the PCI devices a 100 to d 130 in the address storage circuit 201, as an operation of the initialization setting, in association with the target operating signals a 20 to d 50 (step S103' of FIG. 11). In other respects, the operation may be same with that of the above-described the system according to the third embodiment. So, the description of steps other than S103' in FIG. 11 is omitted.

Thus, in the present fourth embodiment, there is no need to supply the target operating signals a 20 to d 50 to the address storage circuit 201, and hence, the circuit configuration of the PCI bus monitor circuit 200c may be made more simplified than that in the third embodiment.

Figure 12:
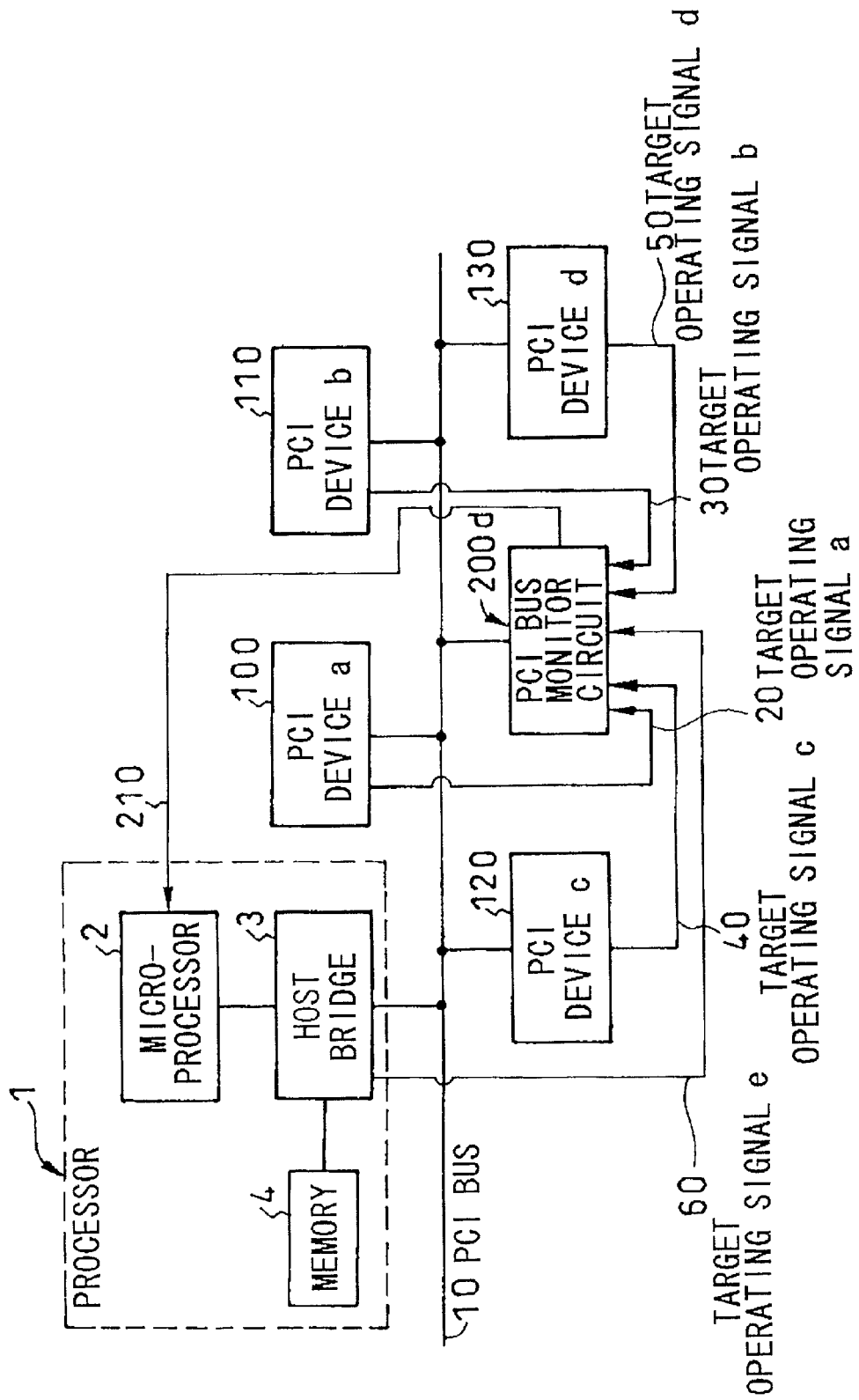
FIG. 12 is a circuit block diagram showing the structure of a system for enabling facilitated analysis of malfunction in the PCI bus according to a fifth embodiment of the present invention.

FIG. 12 is a circuit block diagram showing the structure of the system for enabling facilitated analysis of malfunction in the PCI bus according to a fifth embodiment of the present invention. As compared to the system of the first embodiment, shown in FIG. 1, the systrem according to the present embodiment differs only in that a target operating signal e 60 is sent from the host bridge 3 of the processor unit 1 to a PCI bus monitor circuit 200d.

Figure 13:
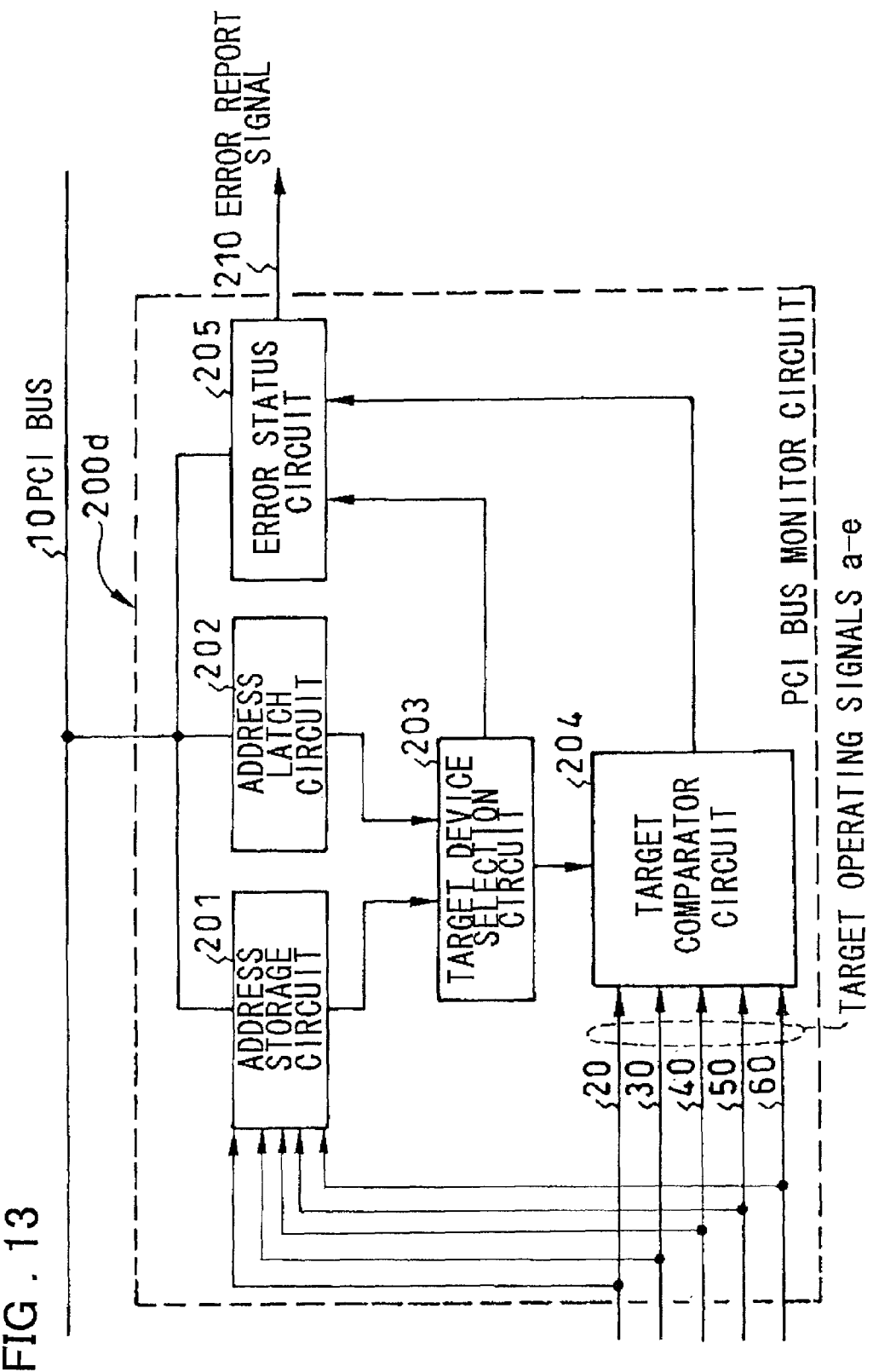
FIG. 13 is a circuit block diagram showing a more detailed structure of a PCI bus shown in FIG. 12.

FIG. 13 is a circuit block diagram showing a more detailed structure of the PCI bus monitor circuit 200d. As compared to the PCI bus monitor circuit 200 according to the first embodiment, shown in FIG. 2, the present PCI bus monitor circuit 200d differs only in that the target operating signal e 60 is sent to the address storage circuit 201 and to the target comparator circuit 204.

In the system for enabling facilitated analysis of malfunction in the PCI bus according to the fifth embodiment, when the processor unit 1 and the PCI devices a 100 to d 130 respond as the PCI target device, the target operating signal e 60 is connected from the processor unit 1 to the PCI bus monitor circuit 200d, thus enabling detection of the mistaken response of the processor unit 1 as the PCI target device.

Figure 14:
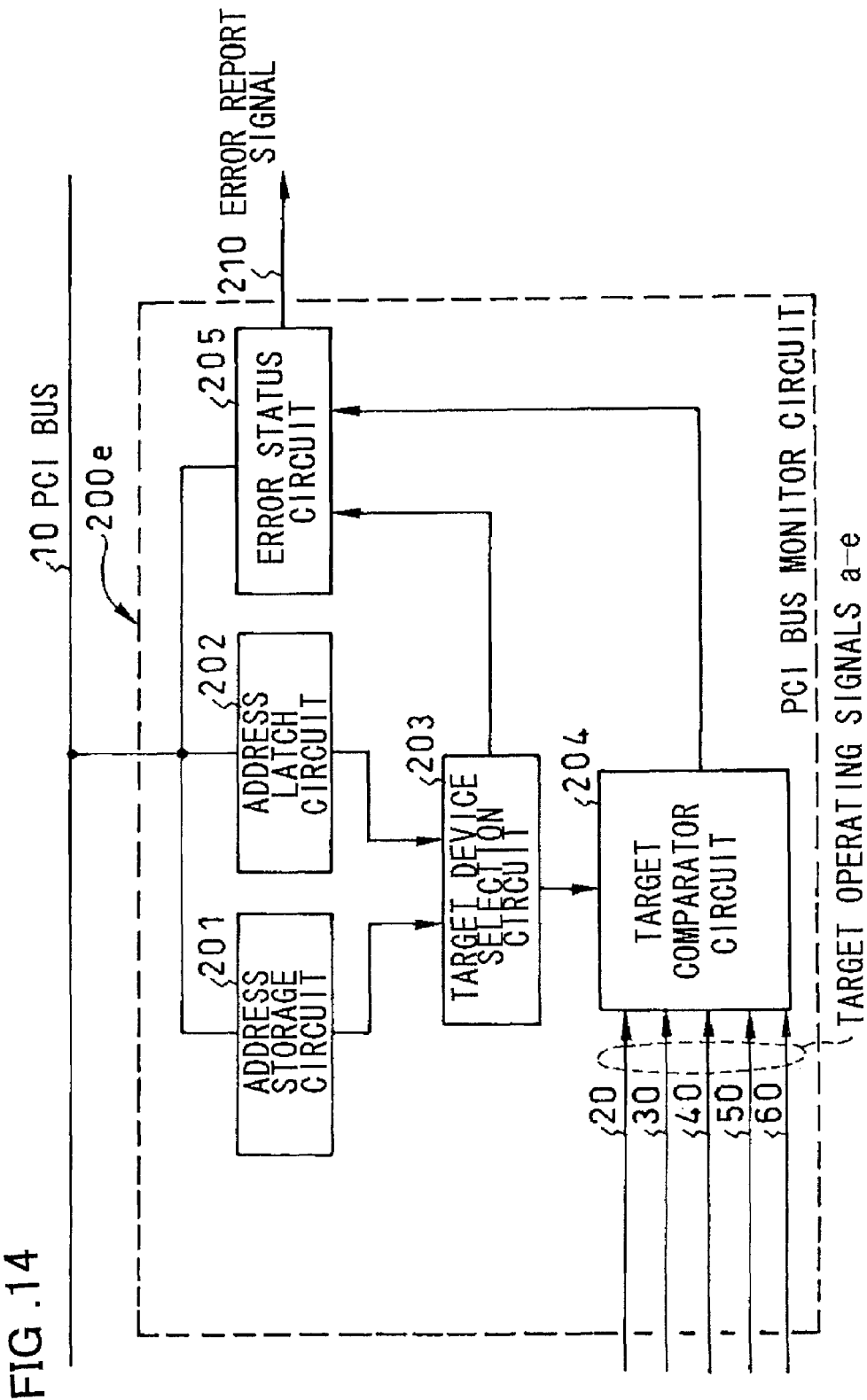
FIG. 14 is a circuit block diagram showing the structure of a PCI bus monitor circuit in a system for enabling facilitated analysis of malfunction in the PCI bus according to a sixth embodiment of the present invention.

FIG. 14 is a circuit block diagram showing the structure of a PCI bus monitor circuit 200e in the system for enabling facilitated analysis of malfunction in the PCI bus according to a sixth embodiment of the present invention. As compared to the PCI bus monitor circuit 200d in the system according to the fifth embodiment, the PCI bus monitor circuit 200e differs only in that the target operating signals a 20 to d 50 are not supplied to the address storage circuit 201.

In contradistinction from the system for enabling facilitated analysis of malfunction in the PCI bus according to the fifth embodiment, in which the initializing process of the processor unit 1 is snooped by the PCI bus monitor circuit 200d and the base address values and the size values of the PCI devices a 100 to d 130 are stored in the address storage circuit 201, the processor unit 1 in the present sixth embodiment sets the base address values and size values of the PCI devices a 100 to d 130 in the address storage circuit 201 in association with the target operating signals a 20 to d 50, by way of an operation of the initialization setting operations. In other respects, the present embodiment may be same with the system for enabling facilitated analysis of malfunction in the PCI bus according to the fifth embodiment.

Thus, in this sixth embodiment, it is no longer necessary to supply the target operating signals a 20 to d 50 to the address storage circuit 201, thus simplifying the circuitry of the PCI bus monitor circuit 200e.

Figure 15:
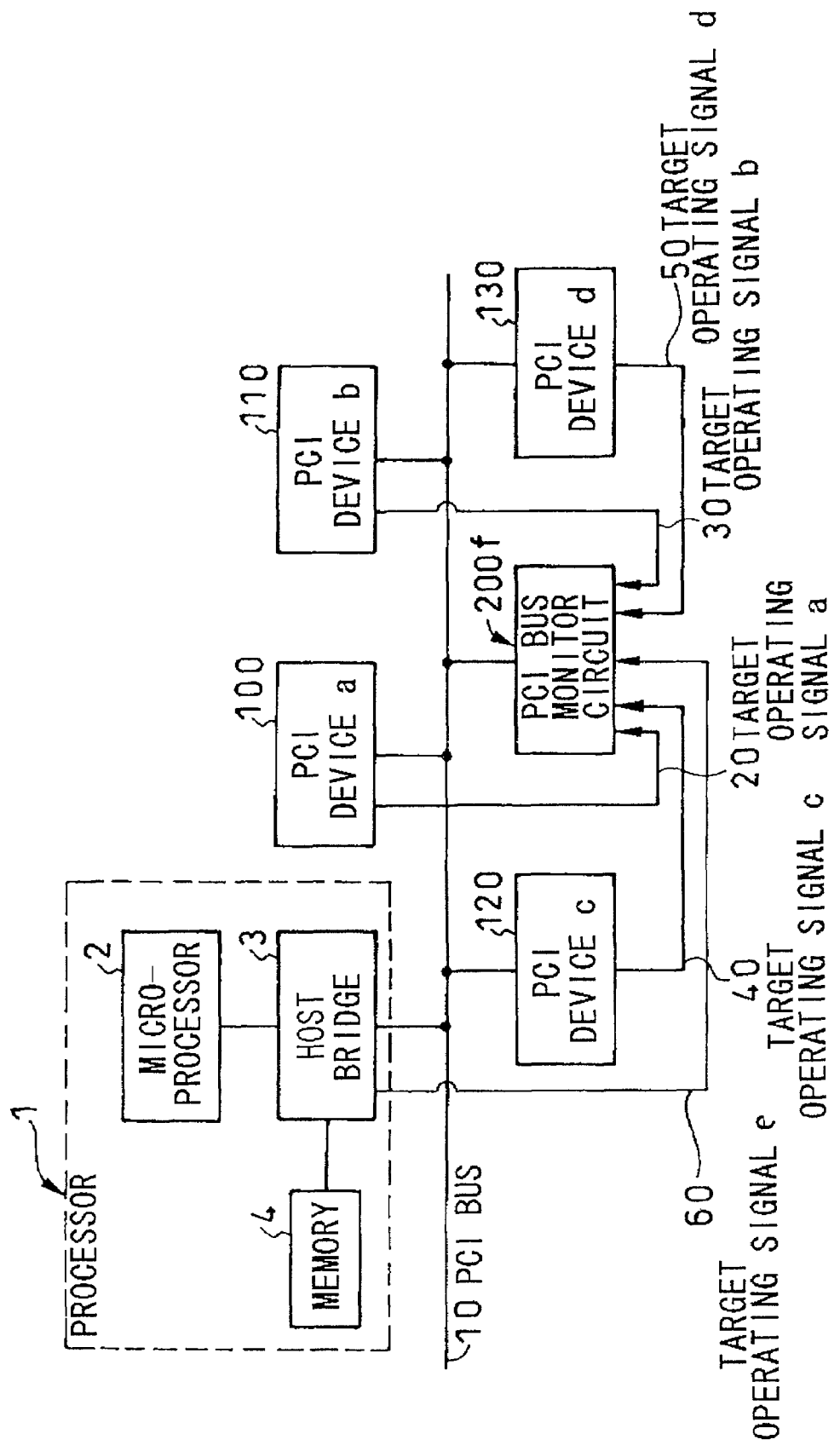
FIG. 15 is a circuit block diagram showing the structure of a system for enabling facilitated analysis of malfunction of the PCI bus according to a seventh embodiment of the present invention.

FIG. 15 is a circuit block diagram showing the system for enabling facilitated analysis of malfunction in the PCI bus according to a seventh embodiment of the present invention. The system according to the seventh embodiment differs from that of the fifth embodiment, shown in FIG. 12, in that the error report signal 210 from the PCI bus monitor circuit 200d to the microprocessor 2 is not used. The PCI bus monitor circuit 200d in the fifth embodiment, shown in FIG. 12, is changed to the PCI bus monitor circuit 200f in the present embodiment.

Figure 16:
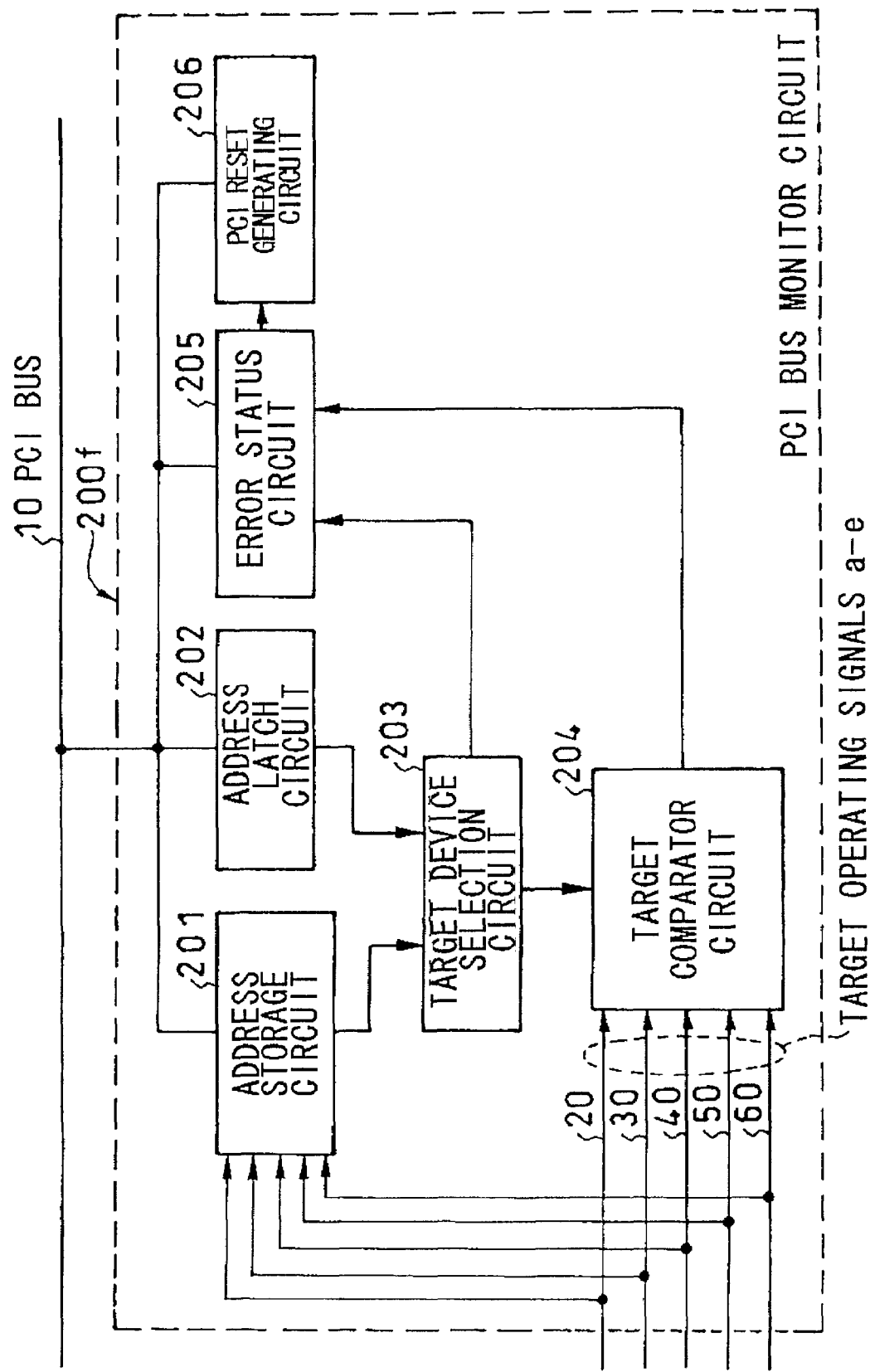
FIG. 16 is a circuit block diagram showing a more detailed structure of the PCI bus monitor circuit shown in FIG. 15.

FIG. 16 is a circuit block diagram showing a more detailed structure of the PCI bus monitor circuit 200f. As compared to the PCI bus monitor circuit 200d in the system according to the fifth embodiment, shown in FIG. 12, the PCI bus monitor circuit 200f in the system according to the seventh embodiment differs in that a PCI reset generating circuit 206, fed with the result of the error status circuit 205, corresponding to the error report signal 210, is provided anew so that the error report signal 210 is not output to outside the PCI bus monitor circuit 200f.

In the system for enabling facilitated analysis of malfunction in the PCI bus according to the seventh embodiment, if target operating signals of plural PCI target devices are active for one PCI cycle, the reset operation of the PCI bus 10 is executed, as the PCI reset generating circuit 206 holds the content of the error status circuit 205, thus resetting all of the PCI devices a 100 to d 130 connected to the PCI bus 10.

The processor unit 1 detects the reset of the PCI bus 10 and make reference to the error status circuit 205 of the PCI bus monitor circuit 200f over the PCI bus 10 to memorize the fact that the target operating signals b 30 and d 50 have become active. The processor unit 1 also determines that, since the PCI target device specified from the target device selection circuit 203 is the PCI device b 110, the PCI device d 130 has made an erroneous response. The processor unit 1 then executes an error recovery process.

Thus, in the seventh embodiment, even if the protocol on the PCI bus 10 becomes illicit because the plural PCI devices of the PCI devices a 100 to d 130 have responded simultaneously, thus producing a deadlock state, the processor unit 1 is able to perform a subsequent reference operation reliably to the error status circuit 205.

Figure 17:
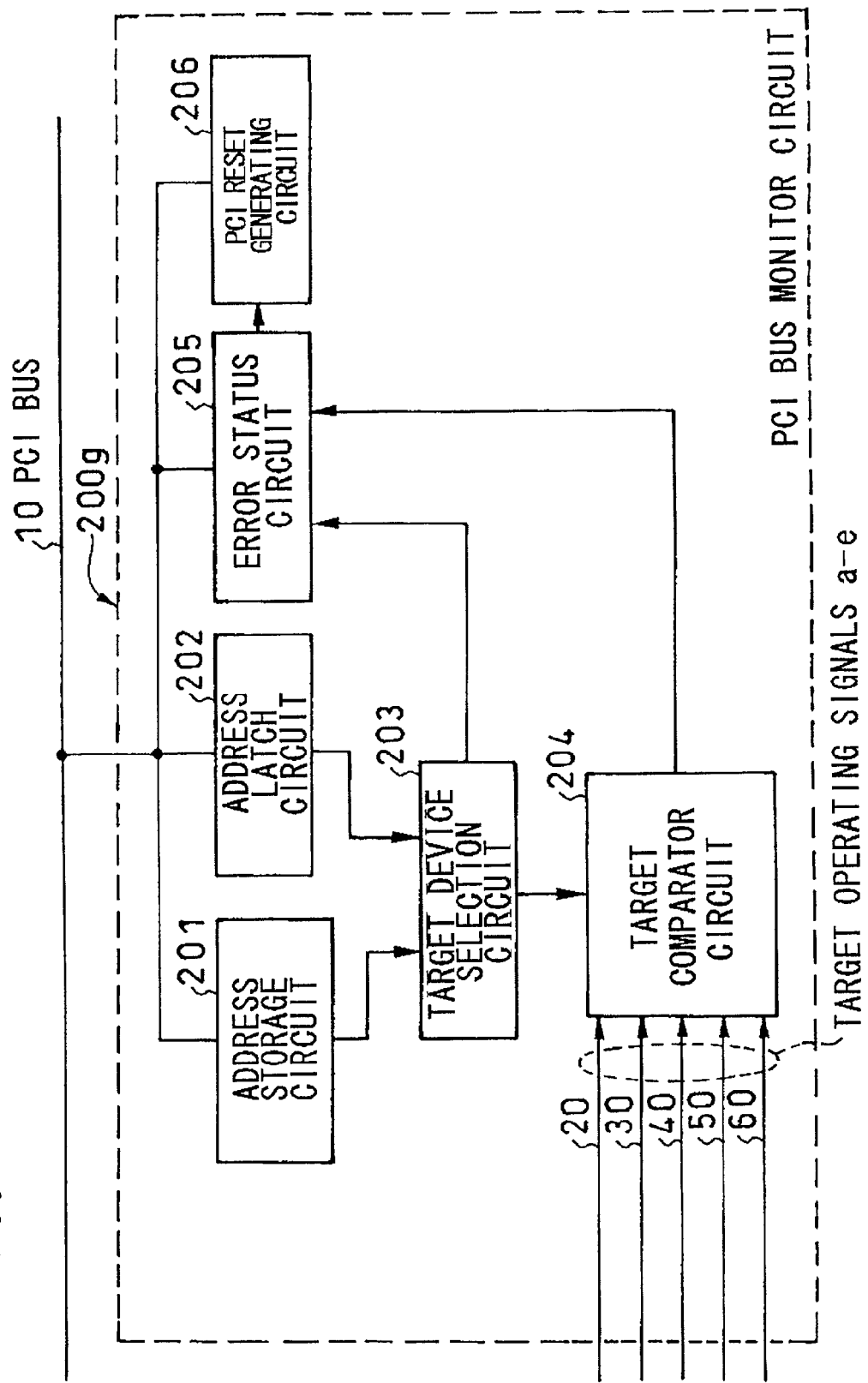
FIG. 17 is a circuit block diagram showing the structure of a PCI bus monitor circuit in a system for enabling facilitated analysis of malfunction in the PCI bus according to an eighth embodiment of the present invention.

FIG. 17 is a circuit block diagram showing the structure of a PCI bus monitor circuit 200g in the system for enabling facilitated analysis of malfunction in the PCI bus according to an eighth embodiment of the present invention. As compared to the PCI bus monitor circuit 200f in the system according to the seventh embodiment shown in FIG. 16, the PCI bus monitor circuit 200g differs only in that the target operating signals a 20 to e 60 are not supplied to the address storage circuit 201.

In contradistinction from the system according to the seventh embodiment, in which the initializing process of the processor unit 1 is snooped by the PCI bus monitor circuit 200f and the base address values and the size values of the PCI devices a 100 to d 130 are stored in the address storage circuit 201, the processor unit 1 in the system according to the eighth embodiment, sets the base address values and size values of the PCI devices a 100 to d 130 in the address storage circuit 201 in association with the target operating signals a 20 to d 50, as an operation of the initialization setting. In other respects, the present embodiment may be same with the system for enabling facilitated analysis of malfunction in the PCI bus according to the seventh embodiment.

Thus, in this eighth embodiment, it is no longer necessary to provide the target operating signals a 20 to d 50 to the address storage circuit 201, thus simplifying the circuitry of the PCI bus monitor circuit 200g as compared to the seventh embodiment described above.

The present invention is not limited to the embodiments so far described and can be modified in a number of ways without departing from its scope. For example, although the four PCI devices a 100 to d 130 are presupposed in the above-described embodiments, the present invention may be practiced if two or more PCI devices are connected to the PCI bus 10.

The meritorious effects of the present invention are summarized as follows.

The meritorious effect of the present invention resides in the fact that the malfunction in case plural PCI target devices have responded for one PCI cycle can be analyzed readily and reliably.

The reason that the analysis can be achieved readily by the present invention is that the PCI bus monitor circuit has the function of specifying a device to which a PCI target device inherently must not respond so that the processor unit referencing this function be enabled to identify the erroneously responding PCI target device.

The reason that the analysis can be achieved reliably by the present invention is that, while the above malfunction is judged by a PCI master device to be the malfunction of the correctly responding PCI target device, but can hardly be judged to be the malfunction of another erroneously responding PCI target device, the information that the PCI device which inherently must not respond as the PCI target device has responded is stored in the PCI bus monitor device, thus enabling the normally responding PCI target device to be distinguished from the illicitly responding PCI target device.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A system for enabling facilitated analysis of malfunctions in a computer device, said system comprising:
    a processor unit;
    a PCI bus;
    a plurality of PCI devices connected to said processor unit by said PCI bus, each PCI device, when operating as a PCI target device, activating a corresponding target operating signal;
    a PCI bus monitor circuit for monitoring a target address of a command from said processor unit to be executed on said PCI bus and monitoring the target operating signals from said plurality of PCI devices, said PCI bus monitor circuit sending an error report signal to said processor unit when plural PCI target devices respond to the command in one PCI cycle; and
    a target device selection circuit for specifying a PCI target device based on the base address values and size values of said plurality of PCI devices and on the target address.

2. The system as defined in claim 1, wherein said PCI bus monitor circuit comprises:
    an address storage circuit for monitoring the operation of said PCI bus at the time of booting said computer device to store the base address values and size values of said plurality of PCI devices in association with the target operating signals;
    an address latch circuit for storing temporarily the target address;
    a target comparator circuit for comparing a result of said target device selection circuit and states of said target operating signals and for detecting that plural PCI target devices have responded in one PCI cycle; and
    an error status circuit for storing the result of said target device selection circuit and plural target operating signals from said target comparator circuit to report to said processor unit that plural PCI target devices have responded in one PCI cycle by way of the error report signal.

3. The system as defined in claim 1, wherein said PCI bus monitor circuit comprises:
an address storage circuit, in which the base address values and size values of said plurality of PCI devices in association with the target operation signals are stored by the processor unit at the time of booting said computer device;
an address latch circuit for storing temporarily the target address;
a target comparator circuit for comparing a result of the target device selection circuit and states of said target operating signals and for detecting that plural PCI target devices have responded in one PCI cycle; and
an error status circuit for storing the result of said target device selection circuit and plural target operating signals from said target comparator circuit to report to said processor unit that plural PCI target devices have responded in one PCI cycle by way of the error report signal.

4. A system for enabling facilitated analysis of malfunctions in a computer device, said system comprising:
a processor unit;
a PCI bus;
a plurality of PCI devices connected to said processor unit by said PCI bus, each PCI device, when operating as a PCI target device, activating a corresponding target operating signal;
a PCI bus monitor circuit for monitoring a target address of a command from said processor unit to be executed on said PCI bus and monitoring the target operating signals from said plurality of PCI devices, said PCI bus monitor circuit including a unit for resetting said PCI bus when plural PCI target devices respond to the command in one PCI cycle; and
a target device selection circuit for specifying a PCI target device based on the base address values and size values of said plurality of PCI devices and on the target address.

5. The system as defined in claim 4, wherein said PCI bus monitor circuit comprises:
an address storage circuit for monitoring the operation of said PCI bus at the time of booting said computer device to store the base address values and size values of said plurality of PCI devices in association with the target operating signals;
an address latch circuit for storing temporarily the target address;
a target comparator circuit for comparing a result of said target device selection circuit and states of said target operating signals and for detecting that plural PCI target devices have responded in one PCI cycle;
an error status circuit for storing the result of said target device selection circuit and plural target operating signals from said target comparator circuit; and
a PCI reset generating circuit for executing a reset operation of said PCI bus, with contents of said error status circuit being held by the PCI reset generating circuit to reset all of the PCI devices connected to said PCI bus.

6. The system as defined in claim 4, wherein said PCI bus monitor circuit comprises:
an address storage circuit, in which the base address values and size values of said plurality of PCI devices in association with the target operation signals are stored by the processor unit at the time of booting said computer device;
an address latch circuit for storing temporarily the target address;
a target comparator circuit for comparing a result of the target device selection circuit and states of said target operating signals and for detecting that plural PCI target devices have responded in one PCI cycle;
an error status circuit for storing the result of said target device selection circuit and plural target operating signals from said target comparator circuit; and
a PCI reset generating circuit for executing a reset operation of said PCI bus, with contents of said error status circuit being held by the PCI reset generating circuit to reset all of the PCI devices connected to said PCI bus.

7. A system for enabling facilitated analysis of malfunctions in a computer device, said system comprising:
a PCI bus;
a processor unit connected to said PCI bus, said processor unit activating a corresponding target operating signal when operating as a PCI target device;
a plurality of PCI devices connected to said PCI bus, each of said PCI devices, when operating as a PCI target device, activating a corresponding target operating signal;
a PCI bus monitor circuit for monitoring a target address of a command from said processor unit to be executed on said PCI bus and monitoring the target operating signals from said processor unit and from said plurality of PCI devices, said PCI bus monitor circuit sending an error report signal to said processor unit when plural PCI target devices have responded to the command in one PCI cycle; and
a target device selection circuit for specifying a target device based on the base address values and size values of said plurality of PCI devices and on the target address.

8. The system as defined in claim 7, wherein said PCI bus monitor circuit comprises:
an address storage circuit for monitoring the operation of said PCI bus at the time of booting said computer device to store the base address values and size values of said plurality of PCI devices in association with the target operating signals;
an address latch circuit for storing temporarily the target address;
a target comparator circuit for comparing a result of said target device selection circuit and states of said target operating signals and for detecting that plural PCI target devices have responded in one PCI cycle; and
an error status circuit for storing the result of said target device selection circuit and plural target operating signals from said target comparator circuit to report to said processor unit that plural PCI target devices have responded in one PCI cycle by way of the error report signal.

9. The system as defined in claim 7, wherein said PCI bus monitor circuit comprises:
an address storage circuit, in which the base address values and size values of said plurality of PCI devices in association with the target operation signals are stored by the processor unit at the time of booting said computer device;
an address latch circuit for storing temporarily the target address;

a target comparator circuit for comparing the result of said target device selection circuit and states of said target operating signals and for detecting that plural PCI target devices have responded in one PCI cycle; and an error status circuit for storing the result of said target device selection circuit and plural target operating signals to report to said processor unit that plural PCI target devices have responded in one PCI cycle by way of the error report signal.

10. The system as defined in claim 7, wherein:

said processor unit comprises a micro-processor, a host bridge and a memory, and said target operating signal is sent from said host bridge to said PCI bus monitor circuit.

11. A system for enabling facilitated analysis of malfunctions in a computer device, said system comprising:

a PCI bus;

a processor unit connected to said PCI bus, said processor unit activating a corresponding target operating signal when operating as a PCI target device;

a plurality of PCI devices connected to said PCI bus, each of said PCI devices, when operating as a PCI target device, activating a corresponding target operating signal;

a PCI bus monitor circuit for monitoring a target address of a command from said processor unit to be executed on said PCI bus and monitoring the target operating signals from said plurality of PCI devices, said PCI bus monitor circuit including a unit for resetting said PCI bus when plural PCI target devices respond to the command in one PCI cycle; and a target device selection circuit for specifying a PCI target device based on the base address values and size values of said processor unit and said plurality of PCI devices and on the target address.

12. The system as defined in claim 11, wherein said PCI bus monitor circuit comprises:

an address storage circuit for monitoring the operation of said PCI bus at the time of booting said computer device to store the base address values and size values of said plurality of PCI devices in association with the target operating signals;

an address latch circuit for storing temporarily the target address;

a target comparator circuit for comparing a result of said target device selection circuit and states of said target operating signals and for detecting that plural PCI target devices have responded in one PCI cycle;

an error status circuit for storing the result of said target device selection circuit and plural target operating signals from said target comparator circuit; and a PCI reset generating circuit for executing a reset operation of said PCI bus, with contents of said error status circuit being held by the PCI reset generating circuit to reset all of the PCI devices connected to said PCI bus.

13. The system as defined in claim 11, wherein said PCI bus monitor circuit comprises:

an address storage circuit, in which the base address values and size values of said plurality of PCI devices in association with the target operation signals are stored by the processor unit at the time of booting said computer device;

an address latch circuit for storing temporarily the target address;

a target comparator circuit for comparing the result of the target device selection circuit and states of said target operating signals and for detecting that plural PCI target devices have responded in one PCI cycle;

an error status circuit for storing the result of said target device selection circuit and plural target operating signals from said target comparator circuit; and a PCI reset generating circuit for executing a reset operation of said PCI bus, with contents of said error status circuit held by the PCI reset generating circuit to reset all of the PCI devices connected to said PCI bus.

14. The system as defined in claim 11, wherein:

said processor unit comprises a micro-processor, a host bridge and a memory, and said target operating signal is sent from said host bridge to said PCI bus monitor circuit.

15. A method of facilitated analysis of malfunctions in a computer device which includes a processor unit, a PCI bus, and a plurality of PCI devices connected to the processor unit by the PCI bus, the method comprising:

each PCI device, when operating as a PCI target device, activating a corresponding target operating signal;

monitoring a target address of a command from said processor unit to be executed on the PCI bus;

monitoring the target operating signals from the plurality of PCI devices; and sending an error report signal to the processor unit when plural PCI target devices respond to the command in one PCI cycle, wherein monitoring the target operating signals comprises specifying a PCI target device based on stored base address values and size values of the plurality of PCI devices and on a stored target address.

16. The method as defined in claim 15, wherein monitoring the target operating signals further comprises:

comparing the specified PCI target device and states of the target operating signals.

17. The method as defined in claim 16, wherein monitoring the target operating signals further comprises:

storing base address values and size values of the plurality of PCI devices in association with the target operating signals; and storing the target address.

18. The method as defined in claim 16, wherein monitoring the target operating signals further comprises:

detecting that plural PCI target devices have responded in one PCI cycle; and reporting to the processor unit that plural PCI target devices have responded for one PCI cycle by way of the error report signal.

19. A method of facilitated analysis of malfunctions in a computer device which includes a processor unit, a PCI bus, and a plurality of PCI devices connected to the processor unit by the PCI bus, the method comprising:

at each PCI device, when operating as a PCI target device, activating a corresponding target operating signal;

monitoring a target address of a command from said processor unit to be executed on the PCI bus;

monitoring the target operating signals from the plurality of PCI devices; and resetting the PCI bus when plural PCI target devices respond to the command in one PCI cycle, wherein monitoring the target operating signals comprises specifying a PCI target device based on stored base address values and size values of the plurality of PCI devices and on a stored target address.

20. The method as defined in claim 19, wherein monitoring the target address further comprises:
    comparing the specified PCI target device and states of the target operating signals.

21. The method as defined in claim 20, wherein monitoring the target address further comprises:
    storing base address values and size values of the plurality of PCI devices in association with the target operating signals; and
    storing the target address.

22. The method as defined in claim 20, wherein monitoring the target address further comprises:
    detecting that plural PCI target devices have responded in one PCI cycle; and
    resetting the PCI bus to reset all of the PCI devices connected to the PCI bus.

23. A method of facilitated analysis of malfunctions in a computer device which includes a processor unit, a PCI bus, and a plurality of PCI devices connected to said processor unit by the PCI bus, the method comprising:
    activating a corresponding target operating signal when the processor unit is operating as a PCI target device;
    activating, by each PCI device when operating as a PCI target device, a corresponding target operating signal;
    monitoring a target address of a command from the processor unit to be executed on the PCI bus;
    monitoring the target operating signals from the processor unit and from the plurality of PCI devices; and
    sending an error report signal to the processor unit when plural PCI target devices have responded to the command for one PCI cycle,
    wherein monitoring the target operating signals comprises specifying a PCI target device based on stored base address values and size values of the plurality of PCI devices and on a stored target address.

24. The system as defined in claim 23, wherein monitoring the target operating signals further comprises:
    comparing the specified PCI target device and states of the target operating signals.

25. The system as defined in claim 24, wherein monitoring the target operating signals further comprises:
    storing base address values and size values of the plurality of PCI devices in association with the target operating signals; and
    storing the target address.

26. The method as defined in claim 24, wherein monitoring the target address further comprises:
    detecting that plural PCI target devices have responded for one PCI cycle; and
    reporting to the processor unit that plural PCI target devices have responded for one PCI cycle by way of the error report signal.

27. A method of facilitated analysis of malfunctions in a computer device which includes a processor unit, a PCI bus, and a plurality of PCI devices connected to said processor unit by the PCI bus, the method comprising:
    activating a corresponding target operating signal when the processor unit is operating as a PCI target device;
    activating, by each PCI device when operating as a PCI target device, a corresponding target operating signal;
    monitoring a target address of a command from the processor unit to be executed on the PCI bus;
    monitoring the target operating signals from the plurality of PCI devices; and
    resetting the PCI bus when plural PCI target devices respond to the command in one PCI cycle,
    wherein monitoring the target operating signals comprises specifying a PCI target device based on stored base address values and size values of the processor unit and the plurality of PCI devices and on a stored target address.

28. The system as defined in claim 27, wherein monitoring the target address further comprises:
    comparing the specified PCI target device and states of the target operating signals.

29. The system as defined in claim 28, wherein monitoring the target address further comprises:
    storing base address values and size values of the plurality of PCI devices in association with the target operating signals; and
    storing the target address.

30. The method as defined in claim 28, wherein monitoring the target address further comprises:
    detecting that plural PCI target devices have responded in one PCI cycle; and
    resetting the PCI bus to reset all of the PCI devices connected to the PCI bus.

* * * * *